(12) United States Patent
Sharma et al.

(10) Patent No.: US 10,788,892 B2
(45) Date of Patent: Sep. 29, 2020

(54) IN-FIELD ILLUMINATION AND IMAGING FOR EYE TRACKING

(71) Applicant: Facebook Technologies, LLC, Menlo Park, CA (US)

(72) Inventors: Robin Sharma, Redmond, WA (US); Andrew John Ouderkirk, Redmond, WA (US); Qi Zhang, Bellevue, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 1 day.

(21) Appl. No.: 16/033,099

(22) Filed: Jul. 11, 2018

(65) Prior Publication Data

US 2019/0361523 A1 Nov. 28, 2019

Related U.S. Application Data

(60) Provisional application No. 62/675,650, filed on May 23, 2018.

(51) Int. Cl.
| | | |
|---|---|---|
| *G06F 3/01* | (2006.01) | |
| *G02B 27/09* | (2006.01) | |
| *G02B 27/42* | (2006.01) | |
| *G06T 19/00* | (2011.01) | |
| *G02B 27/01* | (2006.01) | |

(52) U.S. Cl.
CPC ......... *G06F 3/013* (2013.01); *G02B 27/0172* (2013.01); *G02B 27/0944* (2013.01); *G02B 27/0955* (2013.01); *G02B 27/0972* (2013.01); *G02B 27/0977* (2013.01); *G02B 27/425* (2013.01); *G02B 27/4294* (2013.01); *G06T 19/006* (2013.01); *G02B 2027/0138* (2013.01); *G02B 2027/0178* (2013.01)

(58) Field of Classification Search
CPC ....... H04N 5/2256; A61B 3/113; G06F 3/013; G02B 27/0093
See application file for complete search history.

(56) References Cited

U.S. PATENT DOCUMENTS

| | | | | |
|---|---|---|---|---|
| 6,064,752 | A | * | 5/2000 | Rozmus ............... A61B 5/1176 348/77 |
| 6,354,504 | B1 | | 3/2002 | Sabourault |
| 9,335,548 | B1 | | 5/2016 | Cakmakci et al. |
| 9,759,913 | B2 | | 9/2017 | Saarikko et al. |

(Continued)

OTHER PUBLICATIONS

International Application No. PCT/US2018/041842, "International Search Report and Written Opinion", dated Feb. 15, 2019, 11 pages.

(Continued)

*Primary Examiner* — Abbas I Abdulselam
(74) *Attorney, Agent, or Firm* — Weaver Austin Villeneuve & Sampson LLP

(57) ABSTRACT

Disclosed herein are techniques for eye tracking in near-eye display devices. In some embodiments, an illuminator for eye tracking is provided. The illuminator includes a light source configured to be positioned within a field of view of an eye of a user; a first reflector configured to shadow the light source from a field of view of a camera; and a second reflector configured to receive light from the light source that is reflected by the eye of the user, and to direct the light toward the camera.

18 Claims, 13 Drawing Sheets

(56) References Cited

U.S. PATENT DOCUMENTS

| | | | |
|---|---|---|---|
| 10,495,879 B1 | 12/2019 | Ahuja et al. | |
| 2013/0099675 A1* | 4/2013 | Ma | G06F 3/0428 |
| | | | 315/152 |
| 2013/0114850 A1 | 5/2013 | Publicover et al. | |
| 2014/0375789 A1 | 12/2014 | Lou et al. | |
| 2015/0177514 A1 | 6/2015 | Maimone et al. | |
| 2016/0019715 A1* | 1/2016 | Haddick | G06F 3/011 |
| | | | 345/633 |
| 2016/0249801 A1 | 9/2016 | Gao | |
| 2017/0138571 A1* | 5/2017 | Chen | F21V 14/02 |
| 2017/0147859 A1 | 5/2017 | Zhang et al. | |
| 2018/0020137 A1* | 1/2018 | Engwall | G02B 27/017 |
| 2019/0265478 A1 | 8/2019 | Cok et al. | |

OTHER PUBLICATIONS

U.S. Appl. No. 15/997,473, "Non-Final Office Action", dated Jan. 17, 2020, 15 pages.

Final Office Action for U.S. Appl. No. 15/997,473, dated Jun. 15, 2020, 15 pages.

* cited by examiner

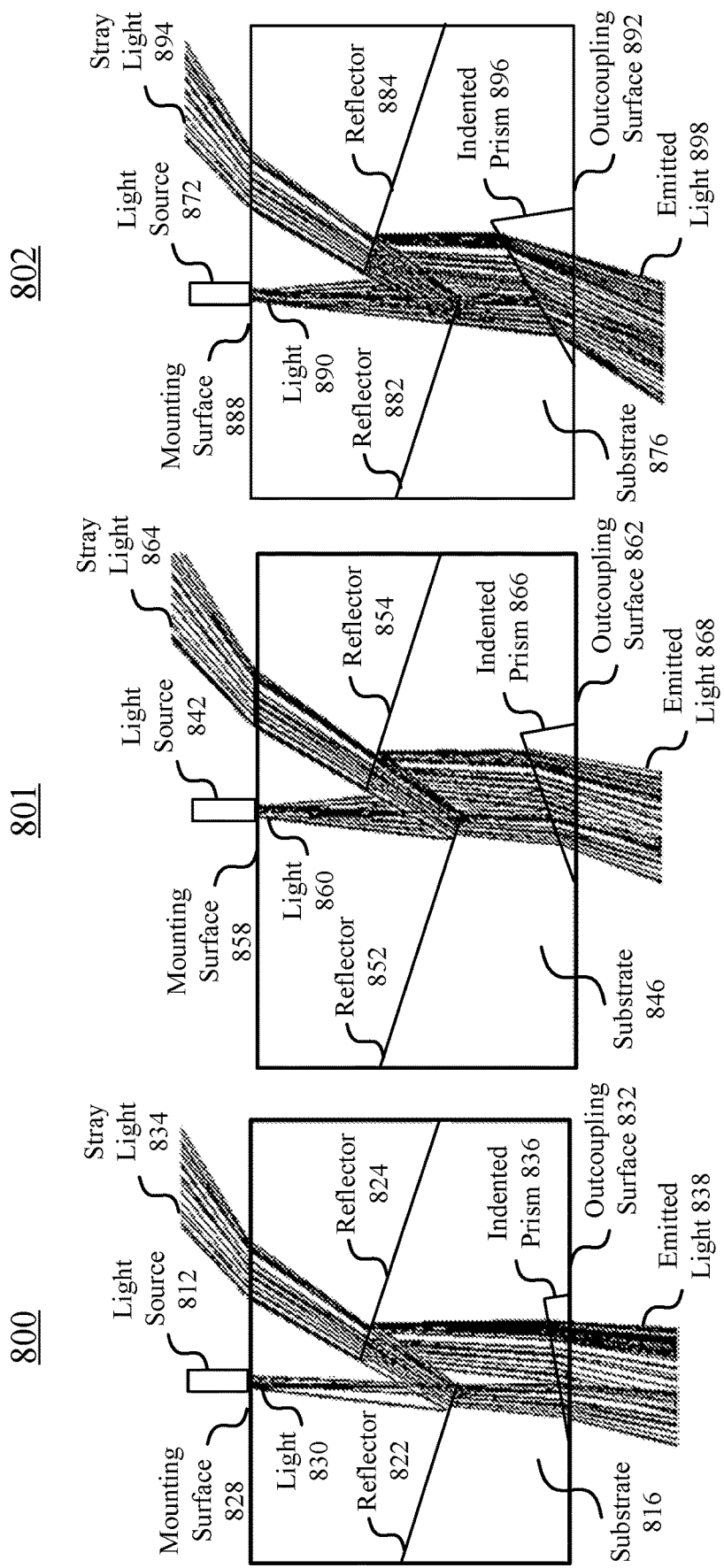

IN-FIELD ILLUMINATION AND IMAGING FOR EYE TRACKING

CROSS-REFERENCE TO RELATED APPLICATION

This application claims priority under 35 U.S.C. § 119 to U.S. Provisional Patent Application No. 62/675,650, filed on May 23, 2018, the contents of which are hereby incorporated by reference in their entirety.

BACKGROUND

An artificial reality system generally includes a display panel configured to present artificial images that depict objects in a virtual environment. The display panel may display virtual objects or combine real objects with virtual objects, as in virtual reality (VR), augmented reality (AR), or mixed reality (MR) applications. To interact with the artificial reality system, a user may need to provide inputs directed to at least a portion of the displayed image. Some artificial reality systems may include a dedicated input/output interface for receiving user inputs, such as hand and/or finger movements. However, traditional input/output interfaces may require frequent and active user inputs, and thus may prevent the user from having a fully immersive experience in the artificial reality environment.

An eye-tracking system can track the gaze of an artificial reality (e.g., VR/AR/MR) system so that the artificial reality system knows where the user is looking, and thus can provide a more immersive interface than a typical input/output interface predominantly reliant on a handheld peripheral input/output device. Eye-tracking may also be used for foveated imaging, foveated transmission of image data, alertness monitoring, etc. Existing eye-tracking systems may use light sources (e.g., infrared light) positioned at the periphery of the user's field of view to illuminate the eye, where the light illuminating the eye may be reflected specularly by the cornea of the user's eye, resulting in "glints" in a captured image of the eye. The position (e.g., gaze direction or rotation position) of the eye may be determined based on, for example, the location of the glints relative to a known feature of the eye (e.g., center of the pupil) in the captured image. Existing eye-tracking systems may also use imaging systems (e.g., cameras) to capture the light reflected by various surfaces of the eye. The cameras may also be positioned at the periphery of the user's field of view.

There may be several issues associated with existing eye-tracking technologies. One of the issues is the size of the glints in the captured image for a light source that may not be a "point source." For example, an LED that may be used as the light source may have an emission area with a linear dimension of 200 μm or more. Thus, when the whole LED emission area is captured, the glint may not appear as a point in the captured image. Consequently, the center location of the glint in the image may not be precisely determined, and the errors in the approximation may lead to errors in the eye-tracking result. Further, the peripheral location of the light sources may negatively impact the accuracy of the eye-tracking due to, for example, the large angles of the illuminating light from the light sources to the eye. While in-field illumination may offer greater accuracy, in-field illumination may have several challenges. For example, light sources that are positioned within the user's field of view may affect the quality of the see-through real-world images and the displayed images. Further, the cameras that are positioned at the periphery of the user's field of view may observe the eye from large angles, thereby reducing the accuracy of the eye-tracking computations. Further, observing the eye from peripheral locations may increase the likelihood that the camera's view of the eye may be obstructed by facial features such as eyelids, eyelashes, etc.

SUMMARY

The present disclosure generally relates to eye tracking in near-eye display devices. In some embodiments, an illuminator for eye tracking is provided. The illuminator includes a light source configured to be positioned within a field of view of an eye of a user; a first reflector configured to shadow the light source from a field of view of a camera; and a second reflector configured to receive light from the light source that is reflected by the eye of the user, and to direct the light toward the camera.

The first reflector may be a first coating on a first prism, and the second reflector may be a second coating on a second prism. A first portion of the second prism that is shadowed by the first reflector may be uncoated, and a second portion of the second prism that is unshadowed by the first reflector may be coated by the first coating. The light source may be configured to emit light that propagates between the first reflector and the second reflector. Each of the first reflector and the second reflector may be configured to reflect infrared light and to transmit visible light.

The illuminator may also include a substrate having a first surface on which the light source is mounted and a second surface through which light is outcoupled toward the eye of the user. The first reflector and the second reflector may be arranged within the substrate between the first surface and the second surface. In addition, the illuminator may include a beam diverting component configured to direct light from the light source toward the eye of the user.

The beam diverting component may be formed on the second surface of the substrate, indented toward the first surface of the substrate, and have a shape of a prism, a cone, a diffraction grating, or a lens. Alternatively, the beam diverting component may be formed on the second surface of the substrate, protrude away from the first surface of the substrate, and have a shape of a prism or a cone. As another alternative, the beam diverting component may be a surface relief grating that is formed at the second surface of the substrate or a volume Bragg grating.

In other embodiments, the beam diverting component may include a third reflector and a fourth reflector, each of which is arranged within the substrate between the first surface and the second surface. The third reflector may be configured to reflect light from the light source to the fourth reflector, and the fourth reflector may be configured to reflect the light toward the second surface of the substrate.

According to another aspect, a system for eye tracking is provided. The system may include any of the configurations of the illuminator described above, along with a camera configured to capture an image of the light source reflected by the eye of the user.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIGS. 8A-8C are simplified diagrams of example illumination systems for eye tracking in example near-eye displays, according to certain embodiments;

DETAILED DESCRIPTION

Figure 1:
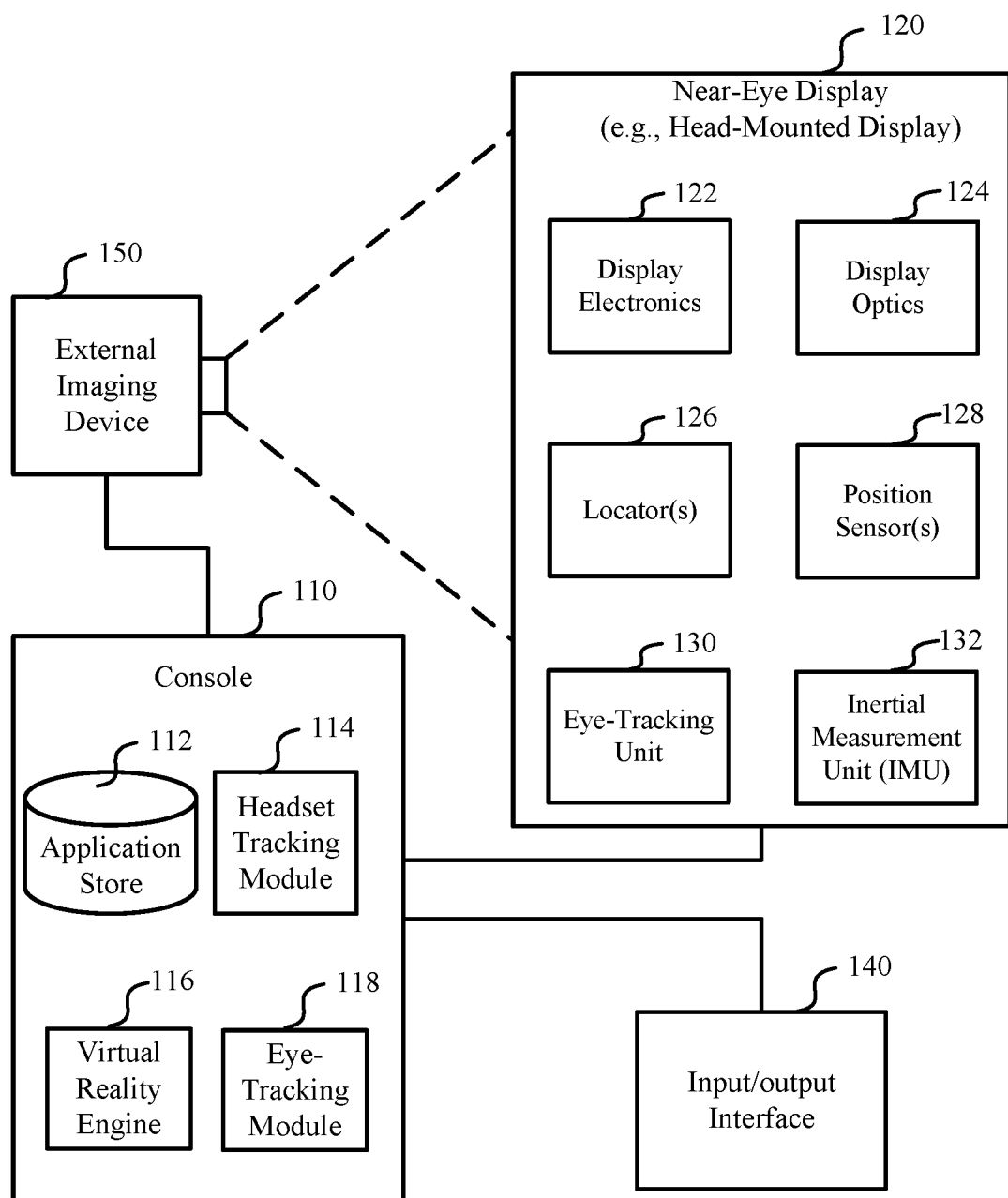
FIG. 1 is a simplified block diagram of an example artificial reality system environment including a near-eye display, according to certain embodiments.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof.

As used herein, visible light may refer to light with a wavelength between about 400 nm and about 750 nm. Near infrared (NIR) light may refer to light with a wavelength between about 750 nm and about 2500 nm. The desired infrared (IR) wavelength range may refer to the wavelength range of IR light that can be detected by a suitable IR sensor (e.g., a complementary metal-oxide semiconductor (CMOS) or a charge-coupled device (CCD) sensor), such as between 830 nm and 860 nm or between 930 nm and 980 nm.

As also used herein, a substrate may refer to a medium within which an array of chirped gratings may be inscribed. A chirped grating may refer to a grating whose pitch and angle of orientation changes over the extent of the grating. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to less than about 10 mm. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

An artificial reality system, such as a virtual reality (VR), augmented reality (AR), or mixed reality (MR) system, may include a near-eye display (e.g., a headset or a pair of glasses) configured to present content to a user via an electronic or optic display and, in some cases, may also include a console configured to generate content for presentation to the user and to provide the generated content to the near-eye display for presentation. To improve user interaction with presented content, the console may modify or generate content based on a location where the user is looking, which may be determined by tracking the user's eye. Tracking the eye may include tracking the position and/or shape of the pupil of the eye, and/or the rotational position (gaze direction) of the eye. To track the eye, the near-eye display may illuminate a surface of the user's eye using light sources mounted to or within the near-eye display, according to at least one embodiment. An imaging device (e.g., a camera) included in the vicinity of the near-eye display may then capture light reflected by various surfaces of the user's eye. Light that is reflected specularly off the cornea of the user's eye may result in "glints" in the captured image. One way to illuminate the eye to see the pupil as well as the glints is to use a two-dimensional (2D) array of light-emitting diodes (LEDs). According to embodiments of the invention, these LEDs may be placed within the user's field of view. Techniques such as a centroiding algorithm may be used to accurately determine the locations of the glints on the eye in the captured image, and the rotational position (e.g., the gaze direction) of the eye may then be determined based on the locations of the glints relative to a known feature of the eye (e.g., the center of the pupil) within the captured image.

Positioning a single light source or a plurality of light sources within the user's field of view may offer greater eye-tracking accuracy than positioning the light sources at the periphery of the user's field of view. For example, the probability of capturing glints over all gaze angles of the eye is higher when the light sources are located within the user's field of view. Further, the light sources may be configured such that they are effectively invisible to the user. This may be accomplished by using light sources with a very small form factor, such as less than 500 nm, less than 400 nm, or less than 200 µm. The form factor may refer to a maximum linear dimension of the light source in a plane that is parallel to an emission surface of the light source. A form factor of 200 µm may be a lower limit of what an eye is able to resolve. Alternatively, a form factor of 200 µm may be an upper limit of what is bothersome to the user when the light source is within the user's field of view. For example, a light source with a form factor of 200 µm may appear similar to a dust speck on the user's glasses, and may not interfere with the user's vision through the glasses. Some examples of light sources with a very small form factor are vertical cavity surface emitting lasers (VCSELs) that have a bare die size of less than 160 µm and an emission cone with an angle of less than 25°, and micro-LEDs that have a bare die size of less than 200 µm and an emission cone with an angle of less than 30°. The die size may refer to a linear dimension of the VCSEL or the micro-LED in a plane that is parallel to an emission surface of the VCSEL or the micro-LED. For example, the VCSEL or the micro-LED may have a square shape within the plane that is parallel to the emission surface, such that each of the sides of the square has a linear dimension of less than 200 µm. Further, positioning the light sources within the user's field of view may offer greater flexibility in the placement and distribution of the light sources, such that the amount of light captured by the camera is maximized. Although the eye may be able to detect near infrared light from a light source that is very bright, the light sources may be operated at lower brightness levels to minimize this effect.

FIG. 1 is a simplified block diagram of an example artificial reality system environment 100 including a near-eye display 120, in accordance with certain embodiments. Artificial reality system environment 100 shown in FIG. 1 may include a near-eye display 120, an external imaging device 150, and an input/output interface 140 that are each coupled to a console 110. While FIG. 1 shows example artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In alternative configurations, different or additional components may be included in artificial reality system environment 100.

Near-eye display 120 may be a head-mounted display that presents content to a user. Examples of content presented by near-eye display 120 include one or more of images, videos, audios, or some combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form factor, including a pair of glasses. Additionally, in various embodiments, the functionality described herein may be used in a headset that combines images of an environment external to near-eye display 120 and content received from console 110, or from any other console generating and providing content to a user. Therefore, near-eye display 120, and methods for eye tracking described herein, may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, one or more locators 126, one or more position sensors 128, an eye-tracking unit 130, and an inertial measurement unit (IMU) 132. Near-eye display 120 may omit any of these elements or include additional elements in various embodiments. Additionally, in some embodiments, near-eye display 120 may include elements combining the function of various elements described in conjunction with FIG. 1.

Display electronics 122 may display images to the user according to data received from console 110. In various embodiments, display electronics 122 may include one or more display panels, such as a liquid crystal display (LCD), an organic light emitting diode (OLED) display, a micro-LED display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include sub-pixels to emit light of a predominant color such as red, green, blue, white, or yellow. In some implementations, display electronics 122 may display a 3D image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), or magnify image light received from display electronics 122, correct optical errors associated with the image light, and present the corrected image light to a user of near-eye display 120. In various embodiments, display optics 124 may include one or more optical elements. Example optical elements may include a substrate, optical waveguides, an aperture, a Fresnel lens, a convex lens, a concave lens, a filter, or any other suitable optical element that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. In some embodiments, display optics 124 may have an effective focal length larger than the spacing between display optics 124 and display electronics 122 to magnify image light projected by display electronics 122. The amount of magnification of image light by display optics 124 may be adjusted by adding or removing optical elements from display optics 124.

Display optics 124 may be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism. In some embodiments, content provided to display electronics 122 for display may be pre-distorted, and display optics 124 may correct the distortion when it receives image light from display electronics 122 generated based on the pre-distorted content.

Locators 126 may be objects located in specific positions on near-eye display 120 relative to one another and relative to a reference point on near-eye display 120. Console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

In some embodiments, locators 126 may be located beneath an outer surface of near-eye display 120. A portion of near-eye display 120 between a locator 126 and an entity external to near-eye display 120 (e.g., external imaging device 150, a user viewing the outer surface of near-eye display 120) may be transparent to the wavelengths of light emitted or reflected by locators 126 or is thin enough to not substantially attenuate the light emitted or reflected by locators 126. In some embodiments, the outer surface or other portions of near-eye display 120 may be opaque in the visible band, but is transparent in the IR band, and locators 126 may be under the outer surface and may emit light in the IR band.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more imaging devices configured to capture eye tracking data, which an eye-tracking module 118 in console 110 may use to track the user's eye. Eye tracking data may refer to data output by eye-tracking unit 130. Example eye tracking data may include images captured by eye-tracking unit 130 or information derived from the images captured by eye-tracking unit 130. Eye tracking may refer to determining an eye's position, including orientation and location of the eye, relative to near-eye display 120. For example, eye-tracking module 118 may output the eye's pitch and yaw based on images of the eye captured by eye-tracking unit 130. In various embodiments, eye-tracking unit 130 may measure electromagnetic energy reflected by the eye and communicate the measured electromagnetic energy to eye-tracking module 118, which may then determine the eye's position based on the measured electromagnetic energy. For example, eye-tracking unit 130 may measure electromagnetic waves such as visible light, infrared light, radio waves, microwaves, waves in any other part of the electromagnetic spectrum, or a combination thereof reflected by an eye of a user.

Eye-tracking unit 130 may include one or more eye-tracking systems. An eye-tracking system may include an imaging system to image one or more eyes and may optionally include a light emitter, which may generate light that is directed to an eye such that light reflected by the eye may be captured by the imaging system. For example, eye-tracking unit 130 may include a coherent light source (e.g., a VCSEL) emitting light in the visible spectrum or infrared spectrum, and a camera capturing the light reflected by the user's eye. As another example, eye-tracking unit 130 may capture reflected radio waves emitted by a miniature radar unit.

Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

In some embodiments, eye-tracking unit 130 may include one light emitter and one camera to track each of the user's eyes. In other embodiments, eye-tracking unit 130 may include a plurality of light emitters and one camera to track each of the user's eyes. Eye-tracking unit 130 may also include different eye-tracking systems that operate together to provide improved eye tracking accuracy and responsiveness. For example, eye-tracking unit 130 may include a fast eye-tracking system with a fast response time and a slow eye-tracking system with a slower response time. The fast eye-tracking system may frequently measure an eye to capture data used by eye-tracking module 118 to determine the eye's position relative to a reference eye position. The slow eye-tracking system may independently measure the eye to capture data used by eye-tracking module 118 to determine the reference eye position without reference to a previously determined eye position. Data captured by the slow eye-tracking system may allow eye-tracking module 118 to determine the reference eye position with greater accuracy than the eye's position determined from data captured by the fast eye-tracking system. In various embodiments, the slow eye-tracking system may provide eye-tracking data to eye-tracking module 118 at a lower frequency than the fast eye-tracking system. For example, the slow eye-tracking system may operate less frequently or have a slower response time to conserve power.

Eye-tracking unit 130 may be configured to estimate the orientation of the user's eye. The orientation of the eye may correspond to the direction of the user's gaze within near-eye display 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about ±4° vertically. Because the foveal axis is defined according to the fovea, which is located in the back of the eye, the foveal axis may be difficult or impossible to measure directly in some eye tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking unit 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking unit may also be detected. Translation of this type may occur, for example, due to a shift in the position of near-eye display 120 on a user's head. Eye-tracking unit 130 may also detect the torsion of the eye and the rotation of the eye about the pupillary axis. Eye-tracking unit 130 may use the detected torsion of the eye to estimate the orientation of the foveal axis from the pupillary axis. Eye-tracking unit 130 may also track a change in the shape of the eye, which may be approximated as a skew or scaling linear transform or a twisting distortion (e.g., due to torsional deformation). Eye-tracking unit 130 may estimate the foveal axis based on some combinations of the angular orientation of the pupillary axis, the translation of the eye, the torsion of the eye, and the current shape of the eye.

In some embodiments, eye-tracking unit 130 may include multiple emitters or at least one emitter that can project a structured light pattern on all portions or a portion of the eye. The structured light pattern may be distorted due to the shape of the eye when viewed from an offset angle. Eye-tracking unit 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking unit 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking unit 130 can also estimate the pupillary axis, the translation of the eye, the torsion of the eye, and the current shape of the eye based on the image of the distorted structured light pattern captured by the camera.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect (or the nearest point between the two axes). The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, a virtual reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or some combination thereof, to predict a future location of near-eye display 120. Headset tracking module 114 may provide the estimated or predicted future position of near-eye display 120 to VR engine 116.

Headset tracking module 114 may calibrate the artificial reality system environment 100 using one or more calibration parameters, and may adjust one or more calibration parameters to reduce errors in determining the position of near-eye display 120. For example, headset tracking module 114 may adjust the focus of external imaging device 150 to obtain a more accurate position for observed locators on near-eye display 120. Moreover, calibration performed by headset tracking module 114 may also account for information received from IMU 132. Additionally, if tracking of near-eye display 120 is lost (e.g., external imaging device 150 loses line of sight of at least a threshold number of locators 126), headset tracking module 114 may re-calibrate some or all of the calibration parameters.

VR engine 116 may execute applications within artificial reality system environment 100 and receive position information of near-eye display 120, acceleration information of near-eye display 120, velocity information of near-eye display 120, predicted future positions of near-eye display 120, or some combination thereof from headset tracking module 114. VR engine 116 may also receive estimated eye position and orientation information from eye-tracking module 118. Based on the received information, VR engine 116 may determine content to provide to near-eye display 120 for presentation to the user. For example, if the received information indicates that the user has looked to the left, VR engine 116 may generate content for near-eye display 120 that mirrors the user's eye movement in a virtual environment. Additionally, VR engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking unit 130 may output eye-tracking data including images of the eye, and eye-tracking module 118 may determine the eye's position based on the images. For example, eye-tracking module 118 may store a mapping between images captured by eye-tracking unit 130 and eye positions to determine a reference eye position from an image captured by eye-tracking unit 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, as described above, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display 120. Example eye calibration parameters may include an estimated distance between a component of eye-tracking unit 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display 120 may reach the eye (as in some augmented reality applications), the calibration parameters may include correction factors for intensity and color balance due to variations in light from the outside of near-eye display 120. Eye-tracking module 118 may use eye calibration parameters to determine whether the measurements captured by eye-tracking unit 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display 120 experiencing greater than a threshold change in illumination due to external light.

Figure 2:
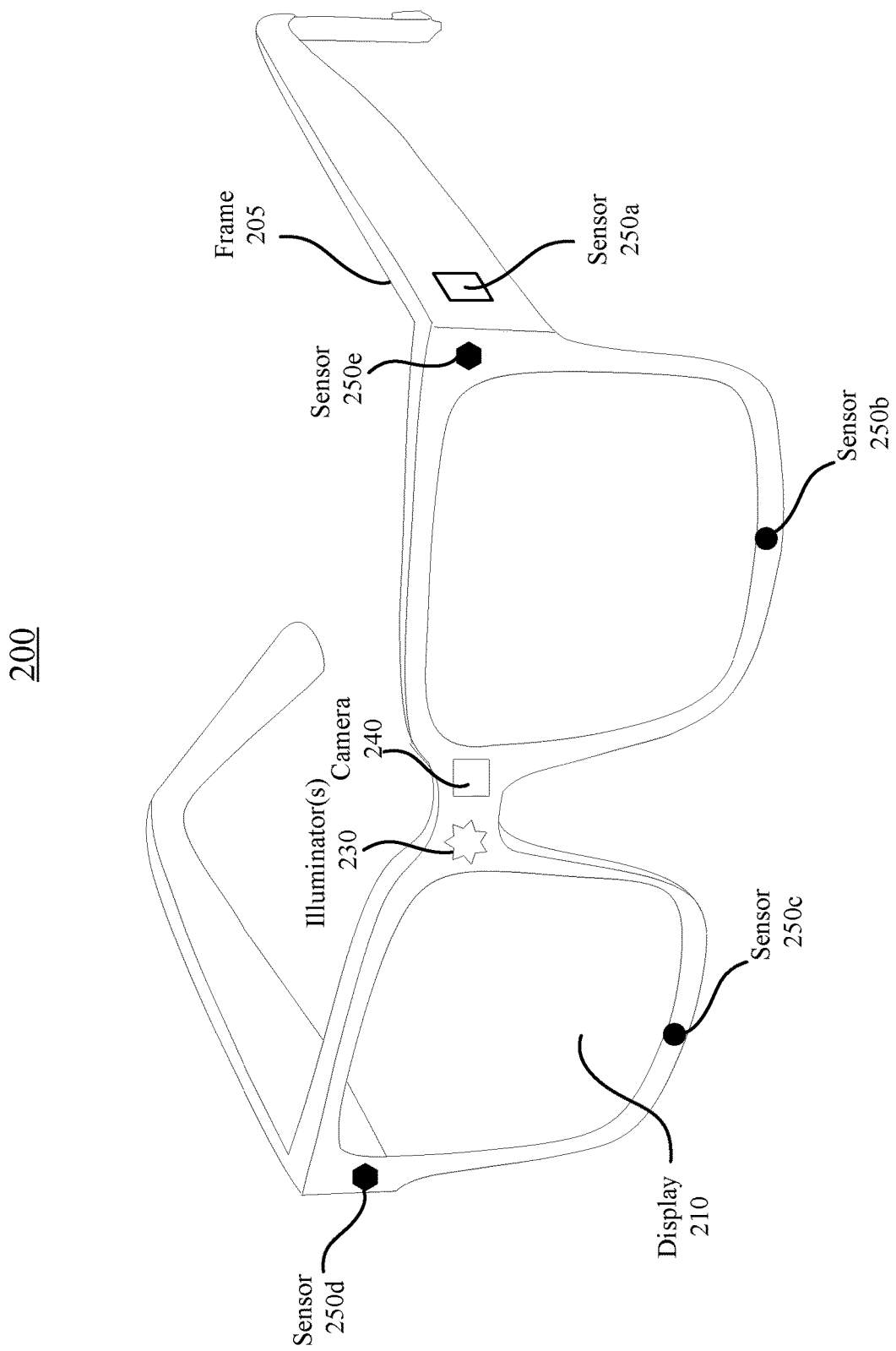
FIG. 2 is a perspective view of a simplified example near-eye display including various sensors.

FIG. 2 is a perspective view of a simplified example near-eye display 200 including various sensors. Near-eye display 200 may be a specific implementation of near-eye display 120 of FIG. 1, and may be configured to operate as a virtual reality display, an augmented reality display, and/or a mixed reality display. Near-eye display 200 may include a frame 205 and a display 210. Display 210 may be configured to present content to a user. In some embodiments, display 210 may include display electronics and/or display optics. For example, as described above with respect to near-eye display 120 of FIG. 1, display 210 may include an LCD display panel, an LED display panel, or an optical display panel (e.g., a waveguide display assembly).

Near-eye display 200 may further include various sensors 250a, 250b, 250c, 250d, and 250e on or within frame 205. In some embodiments, sensors 250a-250e may include one or more depth sensors, motion sensors, position sensors, inertial sensors, or ambient light sensors. In some embodiments, sensors 250a-250e may include one or more image sensors configured to generate image data representing different fields of views in different directions. In some embodiments, sensors 250a-250e may be used as input devices to control or influence the displayed content of near-eye display 200, and/or to provide an interactive VR/AR/MR experience to a user of near-eye display 200. In some embodiments, sensors 250a-250e may also be used for stereoscopic imaging.

In some embodiments, near-eye display 200 may further include one or more illuminators 230 to project light into the physical environment. The projected light may be associated with different frequency bands (e.g., visible light, infra-red light, ultra-violet light, etc.), and may serve various purposes. For example, illuminator(s) 230 may project light in a dark environment (or in an environment with low intensity of infra-red light, ultra-violet light, etc.) to assist sensors 250a-250e in capturing images of different objects within the dark environment. In some embodiments, illuminator(s) 230 may be used to project certain light pattern onto the objects within the environment. In some embodiments, illuminator(s) 230 may be used as locators, such as locators 126 described above with respect to FIG. 1.

In some embodiments, near-eye display 200 may also include a high-resolution camera 240. Camera 240 may capture images of the physical environment in the field of view. The captured images may be processed, for example, by a virtual reality engine (e.g., virtual reality engine 116 of FIG. 1) to add virtual objects to the captured images or modify physical objects in the captured images, and the processed images may be displayed to the user by display 210 for AR or MR applications.

Figure 3:
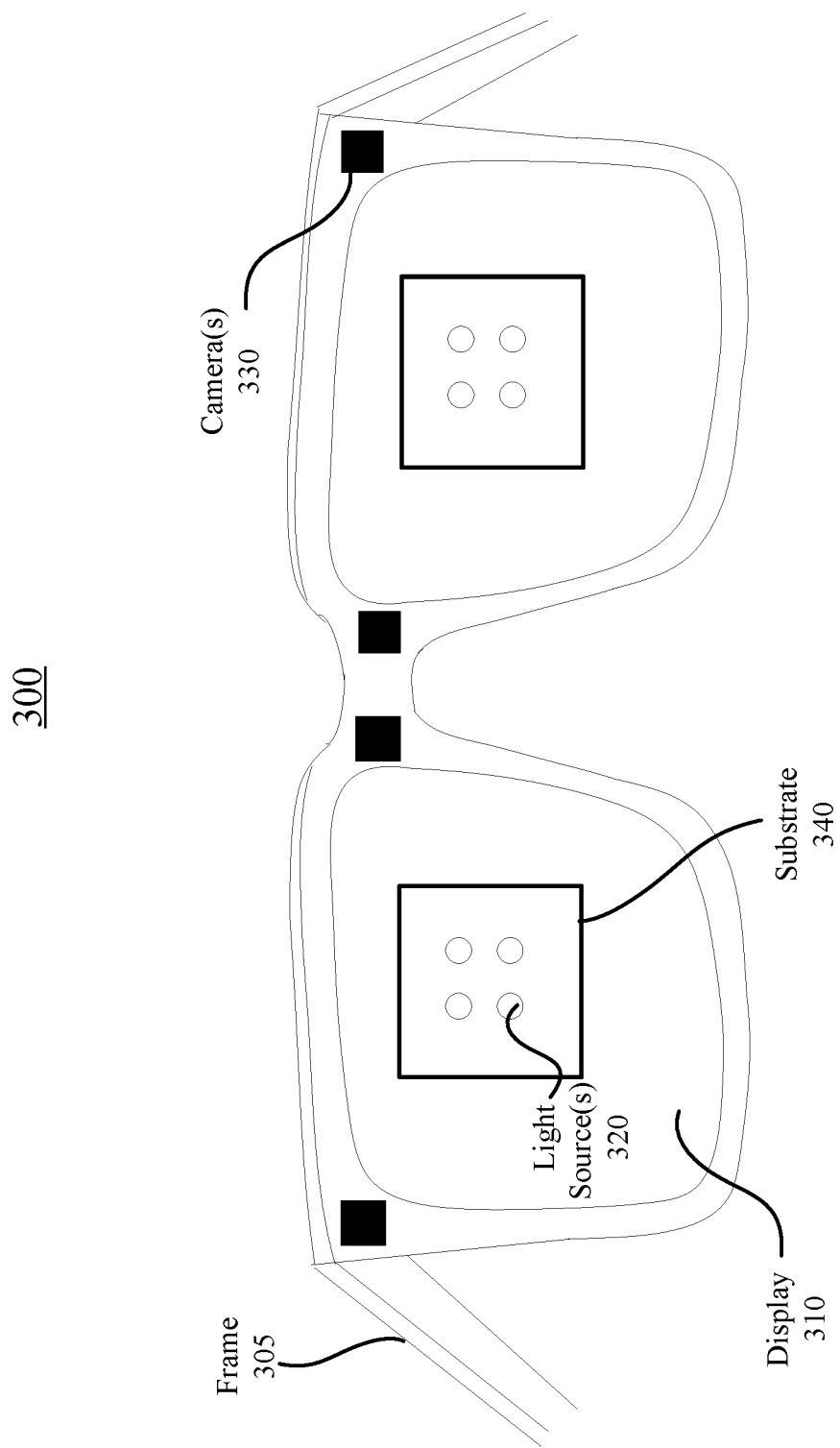
FIG. 3 is a perspective view of a simplified example near-eye display including an example eye-tracking unit.

FIG. 3 is a perspective view of a simplified example near-eye display 300 including an example eye-tracking unit. FIG. 3 may be the perspective view of near-eye display 300 viewed from the side that faces the eyes of the user. As near-eye display 200, near-eye display 300 may include a frame 305 and a display 310. Frame 305 may be coupled to or embedded with one or more electrical or optical components. Display 310 may include display electronics and/or display optics, and may be configured to present content to a user. For example, as described above, display 310 may include an LCD display panel, an LED display panel, and/or an optical display panel (e.g., a waveguide display assembly).

Near-eye display 300 may include one or more light sources 320 and one or more cameras 330. As discussed in further detail below, light source(s) 320 may be mounted on a substrate 340, such that light source(s) 320 are positioned within the field of view of the eye of the user. Any suitable number of light source(s) 320 may be used, and light source(s) 320 may be arranged in any suitable pattern, such as a one-dimensional array or a two-dimensional array. Light source(s) 320 may be spaced closer together or farther apart than shown in FIG. 3. Substrate 340 may be mounted in front of the display 310, or may be integrated with the display 310. Substrate 340 may be transparent to visible light. Camera(s) 330 may be coupled to or embedded in frame 305. Light source(s) 320 may emit light in certain frequency range (e.g., NIR) towards the eye of the user. The emitted light may be reflected by the eyes of the user. The reflected light may then be received by camera(s) 330 to form images that may indicate certain characteristics of light source(s) 320 and the eyes of the user. Based on the images captured by camera(s) 330, an eye's position, including the orientation and location of the eye, may be determined. The gaze direction and/or gaze point of the user may also be determined based on the detected eye's position as described above with respect to FIG. 1. The image content displayed on display 310 may then be adjusted accordingly based on the gaze direction and/or gaze point of the user.

Figure 4:
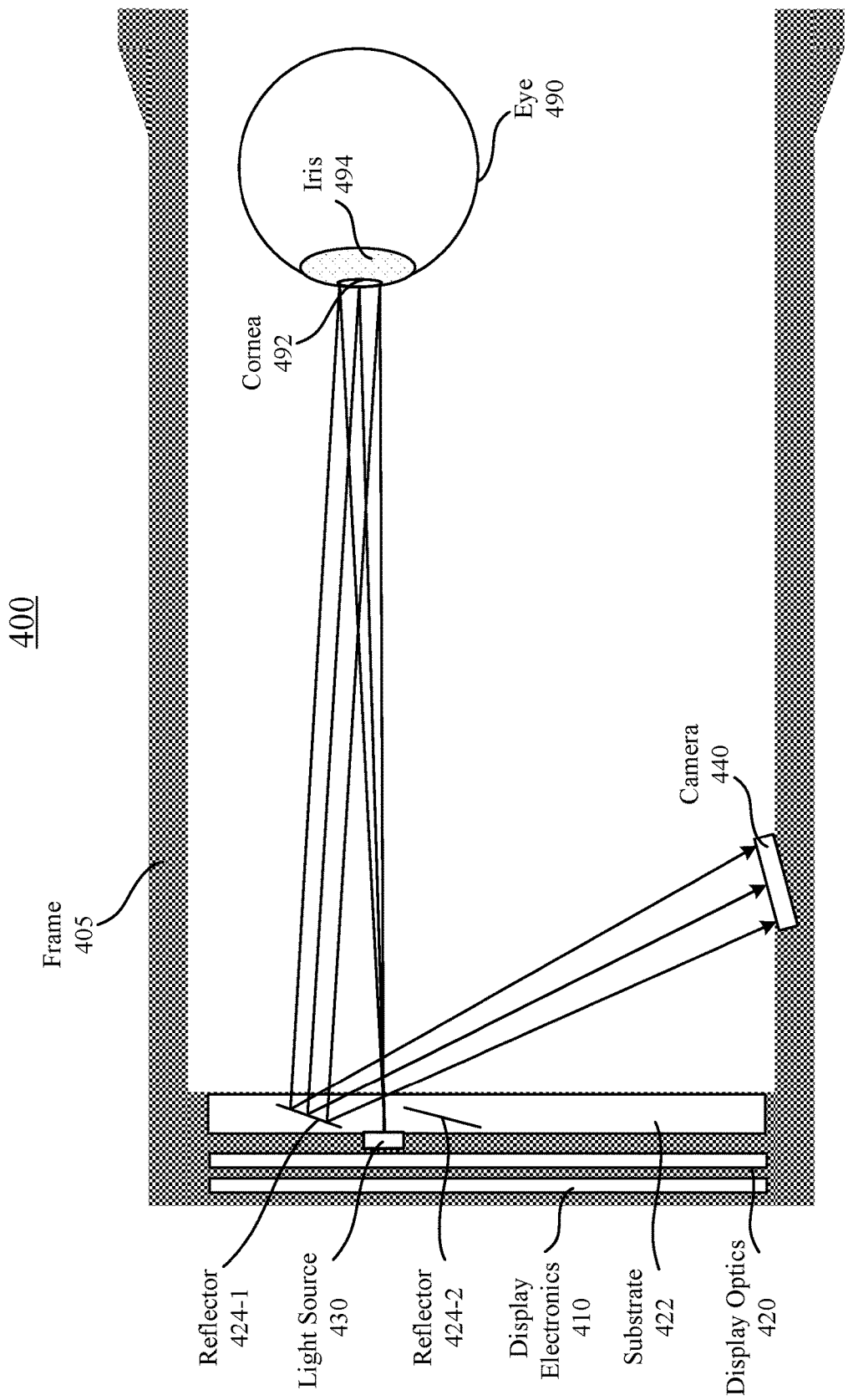
FIG. 4 is a cross-sectional view of an example near-eye display including an example eye-tracking unit.

FIG. 4 is a cross-sectional view of an example near-eye display 400 including an example eye-tracking unit. It is noted that, even though FIG. 4 and other figures in the present disclosure show an eye of a user of a near-eye display for illustration purposes, the eye of the user is not a part of the corresponding near-eye display. Like near-eye displays 200 and 300, near-eye display 400 may include a frame 405 and a display system that includes display electronics 410 and/or display optics 420 coupled to or embedded in frame 405. As described above with respect to display electronics 122, display electronics 410 may display images to the user according to data received from a console, such as console 110. Display electronics 410 may include sub-pixels to emit light of a predominant color, such as red, green, blue, white, or yellow. Display optics 420 may display image content optically (e.g., using optical waveguides and optical couplers), or magnify image light emitted by display electronics 410, correct optical errors associated with the image light, and present the corrected image light to the user of near-eye display 400. In various embodiments, display optics 420 may include one or more optical elements. Example optical elements may include a substrate, optical waveguides, optical couplers, an aperture, a Fresnel lens, a convex lens, a concave lens, a filter, or any other suitable optical element that may affect image light emitted from display electronics 410. Display optics 420 may include a combination of different optical elements as well as mechanical couplings to maintain relative spacing and orientation of the optical elements in the combination. One or more optical elements in display optics 420 may have an optical coating, such as an anti-reflective coating, a reflective coating, a filtering coating, or a combination of different optical coatings.

Near-eye display 400 may include an eye-tracking unit that includes a light source 430 and a camera 440. Light source 430 may be mounted on substrate 422, which may be mounted on, coupled to, or embedded in frame 450 in front of display optics 420. Substrate 450 may be transparent to visible light. Camera 440 may be mounted on, coupled to, or embedded in frame 405. Light source 430 may emit light towards an eye 490 of the user of near-eye display 400, and may be positioned within a field of view of eye 490. The emitted light may be reflected by the cornea 492 of eye 490 of the user. The reflected light may then be further reflected by reflector 424-1 and received by camera 440 to generate images that may indicate certain characteristics of light source 430 and eye 490 of the user. Based on the images captured by camera 440, the position of eye 490, including the orientation and location of eye 490, may be determined. The gaze direction and/or gaze point of the user may be determined based on the detected position of eye 490 as described above with respect to FIG. 1. The image content displayed on the display system may then be adjusted accordingly based on the gaze direction and/or gaze point of the user. Reflector 424-2 may be used to shadow light source 430 from the field of view of camera 440, as discussed in further detail below.

In some implementations, light source 430 may include a coherent light source (i.e., a light source emitting light at a precise wavelength with negligible phase difference), such as a VCSEL. The VCSEL may illuminate a portion of the surface of eye 490, such as cornea 492 or iris 494, with coherent light. For example, the VCSEL may emit light in the infrared spectrum having a wavelength between about 830 nm and about 860 nm. As another example, the VCSEL may emit light having a wavelength between about 900 nm and about 1160 nm, such as between about 930 nm and about 980 nm. Alternatively, the VCSEL may emit light having a wavelength in the visible spectrum. However, illuminating the eye with light in the infrared spectrum may reduce interference and noise from visible light emitted by display electronics 410 or from external visible light that passes into near-eye display 400, as in some augmented reality applications. The VCSEL may have a low power to prevent user discomfort or injury.

Although light source 430 may typically include a coherent light source, non-coherent light sources may be used in some implementations. For example, in some implementations, light source 430 may include an LED emitting light with wavelengths in the visible band or in the infrared band. For example, light source 430 may include a micro-LED. However, because LEDs emit light across a broader wavelength range than a laser, LEDs may produce images with lower contrast than those produced using a coherent light source. In some embodiments, an additional light source that emits light at a different wavelength than the light source may be used to increase eye-tracking precision. Although a single light source 430 and two reflectors 424-1 and 424-2 are shown in FIG. 4, any suitable number of light sources and reflectors may be used.

Camera 440 may capture light reflected by the portion of the eye surface illuminated by light source 430 and further reflected by reflector 424-1. In one example, camera 440 may capture an image with a pixel array of 30 by 30 pixels, where a pixel may correspond to a resolution of about 15 to 40 μm of the eye surface. In this example, the imaged portion of the surface of eye 490 may have an area of between about 0.20 and about 1.44 square millimeters. In various embodiments, camera 440 may have increased resolution to increase eye tracking precision and accuracy. For example, camera 440 may have a quarter video graphic array (QVGA) resolution with a pixel array of 320×240 pixels. Increasing the number of pixels included in camera 440 may allow the size of the surface of eye 490 corresponding to a pixel to be decreased, allow the area of the surface of eye 490 imaged by camera 440 to be increased, or both. However, using fewer pixels may beneficially reduce the power consumption of camera 440, and illuminating and imaging a smaller area of the surface of the eye may beneficially reduce power consumption by light source 430. In some embodiments, camera 440 may include an optical mouse sensor or other sensor capturing images at a very high frame rate. For example, in some cases, camera 440 may capture about 5,000 images per second to provide precise eye tracking data. Although a single camera 440 is shown in FIG. 4, any suitable number of cameras may be used.

Figure 5:
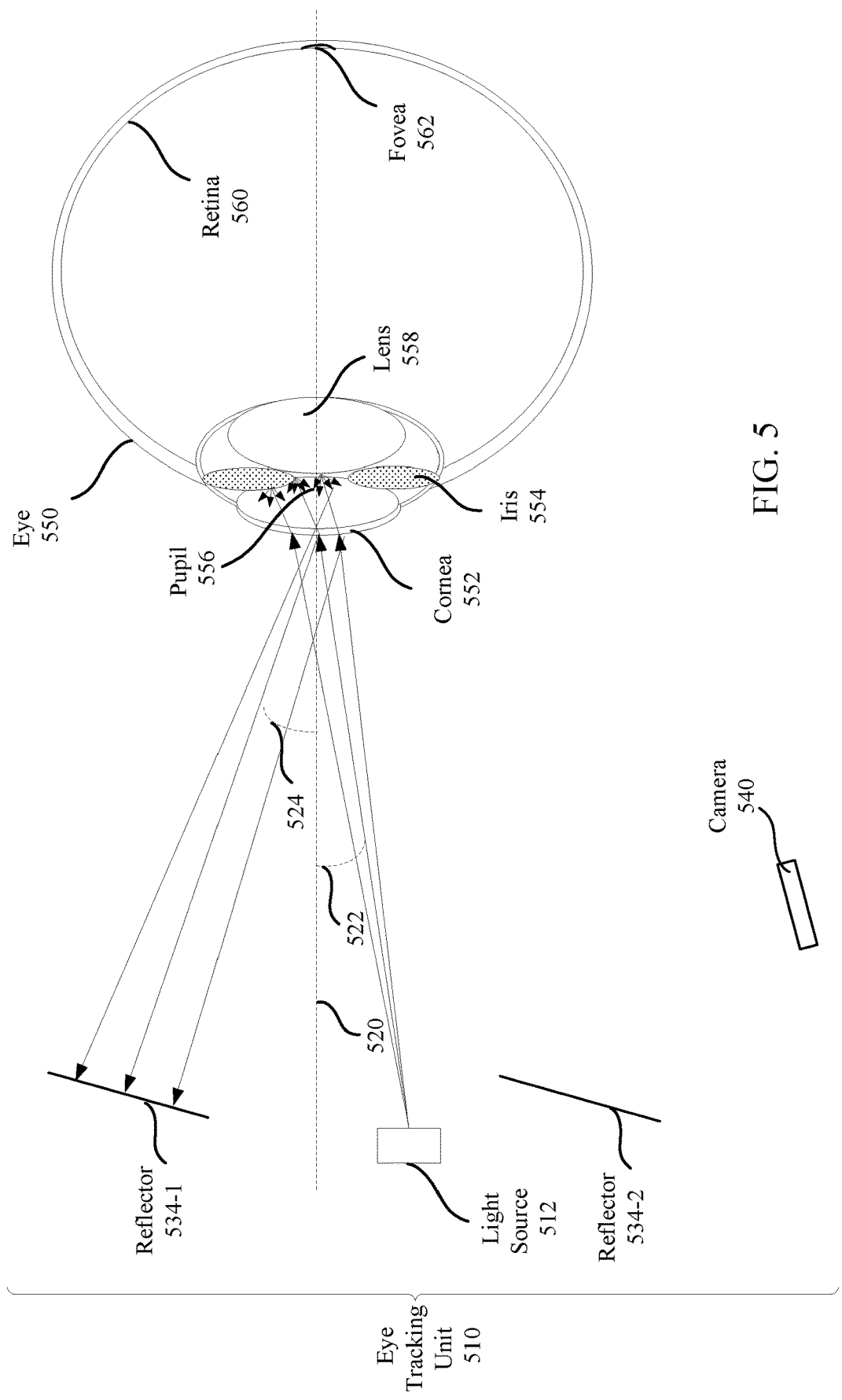
FIG. 5 illustrates light reflections and diffusions by an eye during eye tracking.

FIG. 5 illustrates light reflections and diffusions by an eye 550 during eye tracking using an eye-tracking unit 510. Eye-tracking unit 510 may include a light source 512, a reflector 534-1, and a reflector 534-2 as described above with respect to FIG. 4. Although only one light source 512 is shown in FIG. 5, it should be understood that multiple additional light sources may be placed within the field of view of eye 550. In other embodiments, eye-tracking unit 510 may include different and/or additional components than those depicted in FIG. 4. Light source 512 may include a VCSEL or a micro-LED and may emit light having a center axis that forms an angle 522 relative to a surface normal vector 520 of eye 550. As discussed in further detail below, a beam diverting component may be positioned proximate to an emission area of light source 512 in order to achieve a desired light output direction. Surface normal vector 520 is orthogonal to a portion of the surface (e.g., cornea 552) of eye 550 illuminated by light source 512. In the example shown in FIG. 5, surface normal vector 520 may be the same as the foveal axis (a line from the center of pupil 556 to fovea 562) of eye 550. Alternatively, surface normal vector 520 may be orthogonal to another portion of the surface of eye 550. Angle 522 may be measured between surface normal vector 520 and a line from a center of the portion of the surface of eye 550 illuminated by light source 512 to a center of the output aperture of light source 512. Angle 522 may be chosen to have any suitable value, such that at least a portion of the light from light source 512 is reflected by eye 550 and received by reflector 534-1. For example, angle 522 may be chosen to be close to zero (e.g., between 5° and 10°) in order to minimize any distortions caused by larger incident angles, but greater than zero to prevent the light from being reflected directly back at light source 512 by eye 550. Various reflectors and/or other optical components, such as reflector 534-1, may be used to direct light reflected by eye 550 toward a camera 540. For example, a plurality of reflectors may be immersed in a transparent substrate that may be positioned within the field of view of eye 550.

Reflector 534-1 may be mounted at an angle 524 relative to surface normal vector 520 of eye 550. Reflector 534-1 may be mounted within the field of view of eye 550. Angle 524 may be measured between surface normal vector 520 and a line from a center of the portion of the surface of eye 550 illuminated by light source 512 to a center of reflector 534-1. In some embodiments, a difference between angle 522 and angle 524 may be less than a threshold amount so that reflector 534-1 may reflect images via specular reflections of light incident on cornea 552 of eye 550, which may beneficially increase contrast of the resulting image and minimize light power loss and power consumption.

The light emitted by light source 512 may substantially uniformly illuminate a portion of the eye surface (e.g., cornea 552). A portion of the emitted light may be reflected specularly by cornea 552 of eye 550 and incident on reflector 534-1. In some cases, the light incident on eye 550 may propagate into the eye for a small distance before being reflected. At least some portions of the light may enter eye 550 through cornea 552 and reach iris 554, pupil 556, lens 558, or retina 560 of eye 550. Because the eye surface and the interfaces within eye 550 (e.g., surface of iris 554 or pupil 556) may be rough (e.g., due to features such as capillaries or bumps), the eye surface and the interfaces within eye 550 may scatter the incident light in multiple directions. Different portions of the eye surface and the interfaces within eye 550 may have different arrangements of features. Thus, an intensity pattern of the light reflected by eye 550 may depend on the arrangement of features within the illuminated portion of eye 550, which may allow identification of the portion of the eye from the intensity pattern.

Camera 540 may collect and project light reflected by reflector 534-1 onto an image sensor of camera 540. Camera 540 may also correct one or more optical errors (such as those described with respect to the display optics 124) to improve the contrast and other properties of the images captured by the image sensor of camera 540. In some embodiments, camera 540 may also magnify the reflected light. In some embodiments, camera 540 may enlarge the images. The image sensor of camera 540 may capture incident light focused by a lens assembly of camera 540. Thus, camera 540 may effectively capture an image of light source 512 (the emitted light of which is reflected specularly by the cornea of the eye) reflected by the eye, resulting in a "glint" in the captured image. Because of the scattering (diffusive reflections) at the eye surface and internal interfaces of the eye, light incident on a point of the image sensor may include light reflected from multiple points within the illuminated portion of eye 550, and thus may be the result of the interference of the light reflected from the multiple points. Thus, the image sensor of camera 540 may also capture a diffraction or speckle pattern formed by a combination of light reflected from multiple points of the surface of eye 550.

Each pixel of the image sensor may include a light-sensitive circuit that can output a current or voltage signal proportional to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 540 may include a complementary metal-oxide semiconductor (CMOS) pixel array, which may be used with light having a wavelength less than about 850 nm. As another example, the image sensor of camera 514 may include an indium gallium arsenide (InGaAs) alloy pixel array. Such an image sensor may be used with light having a wavelength between about 900 nm and about 1160 nm.

In some embodiments, to determine a position change of eye 550, an eye-tracking module (e.g., eye-tracking module 118 of FIG. 1) may determine a pixel shift between images. Multiplying the pixel shift by a calibrated distance per pixel may allow the eye-tracking module to determine a distance the surface (e.g., cornea 552) of eye 550 has shifted. For example, if the glint captured in one image is shifted by two pixels relative to the glint captured in a previous image, and each pixel corresponds to a distance of 10 µm at the surface of eye 550, the surface of eye 550 may have moved about 20 µm.

Alternatively or additionally, the eye-tracking module may determine the position of the eye in a captured image by comparing the captured images with one or more previous images having known positions of the eye. For example, the eye-tracking module may include a database of images that are each associated with a reference eye position. By matching the captured image with a stored image, the eye-tracking module may determine that the eye is at the reference eye position associated with the stored image. In some embodiments, the eye-tracking module may identify a feature in a portion of a captured image. The feature may include a diffraction or optical flow pattern associated with a particular portion of eye 550. For example, the eye-tracking module may determine the eye position by retrieving a reference eye position associated with the feature (which was also captured in a reference image), determining a pixel shift between the feature in the captured image and the feature in the reference image, and determining the eye position by modifying the reference eye position according to the determined pixel shift using the calibrated distance per pixel as described above.

As discussed above, camera 540 may effectively capture an image of light source 512 reflected by cornea 552 of eye 550. In some cases, the light source may be an extended source rather than a point source. Thus, the captured image (i.e., glint) of light source 512 may have a shape of a circle, a rectangle, an oval, or an irregular shape, and the spatial structure of light source 512 may be captured in the image. The extended shape of the glint and/or the spatial structure captured in the image of the light source may cause errors when determining the relative location of the glint in the image using, for example, the centroiding algorithm. The errors may affect the accuracy of eye tracking when the relative location (e.g., pixel shift) of the glint in the image is used to determine the corneal location in 3D space. Therefore, the light source 512 may have an emission area with a small form factor that is much less than 200 µm. The small emission area of a VCSEL or a micro-LED would appear more like a point source than an extended source in the image and reduce the size of the resulting glint on the captured image. A VCSEL or a micro-LED that has a bare die size less than 200 µm would have an emission area with a linear dimension that is significantly smaller than 200 µm because the emission area of the VCSEL or micro-LED is much smaller than the bare die size in order to accommodate other components, such as the bond part. For example, a diameter of the emission area may be less than 20 µm. A smaller glint size in the captured image may lead to a more precise glint location determination and more accurate eye tracking.

According to certain aspects of the present disclosure, a light source or a plurality of light sources may be mounted on a transparent substrate that can be positioned in front of the user, such that the light source or plurality of light sources are within the user's field of view. The light source or plurality of light sources may be used for illumination and imaging in eye tracking. A beam diverting component may be provided for each light source, in order to direct light from the light source toward the eye of the user. The beam diverting component may cause at least a portion of the light from the light source to be incident on the eye of the user at an angle with respect to a vector that is normal to a surface of the eye of the user.

Further, according to certain aspects of the present disclosure, a plurality of reflectors (e.g., dichroic mirrors) may be immersed in the transparent substrate that can be positioned in front of the user and within the user's field of view. As discussed in further detail below, the reflectors may shadow the light sources, such that light from the light sources does not directly reach the camera. Each reflector may reflect light in a first band of the optical spectrum (e.g., IR light or NIR light) and transmit light in a second band of the optical spectrum (e.g., visible light). The reflectors may be have a flat, spherical, aspherical, anamorphic, or cylindrical surface. The reflectors may have a reflectivity of at least 30%, at least 50%, and at least 70%, or more, in the desired band of the optical spectrum. The (photopically weighted) transmissivity of the reflector in the working wavelength range (e.g., visible light) may be at least 80%, at least 90%, at least 95%, at least 99%, or higher. Suitable reflectors may include multilayer dielectric reflectors, metallic coatings, and transparent conductive films. The substrate may be transparent to both light in the first band and light in the second band.

In some implementations, the reflectors may be hot mirrors that can reflect IR light but are transparent to visible light. The IR light reflectivity of and visible light transmissivity of the reflectors may vary in a same near-eye display device or in different same near-eye display devices. Because visible light is allowed to pass through the reflectors and the substrate, the reflectors can be positioned in front of the user's eyes without obstructing the user's field of view. For example, in an AR application, the user can look through the substrate and the immersed reflectors to see the outside world. In a VR application, the user can look through the substrate and the immersed reflectors to view the displayed content. At the same time, light from a light source for eye illumination may be reflected by the user's eye (e.g., cornea), and may then be reflected by the reflectors to a camera to form the glints in images captured by the camera for eye tracking.

Figure 6:
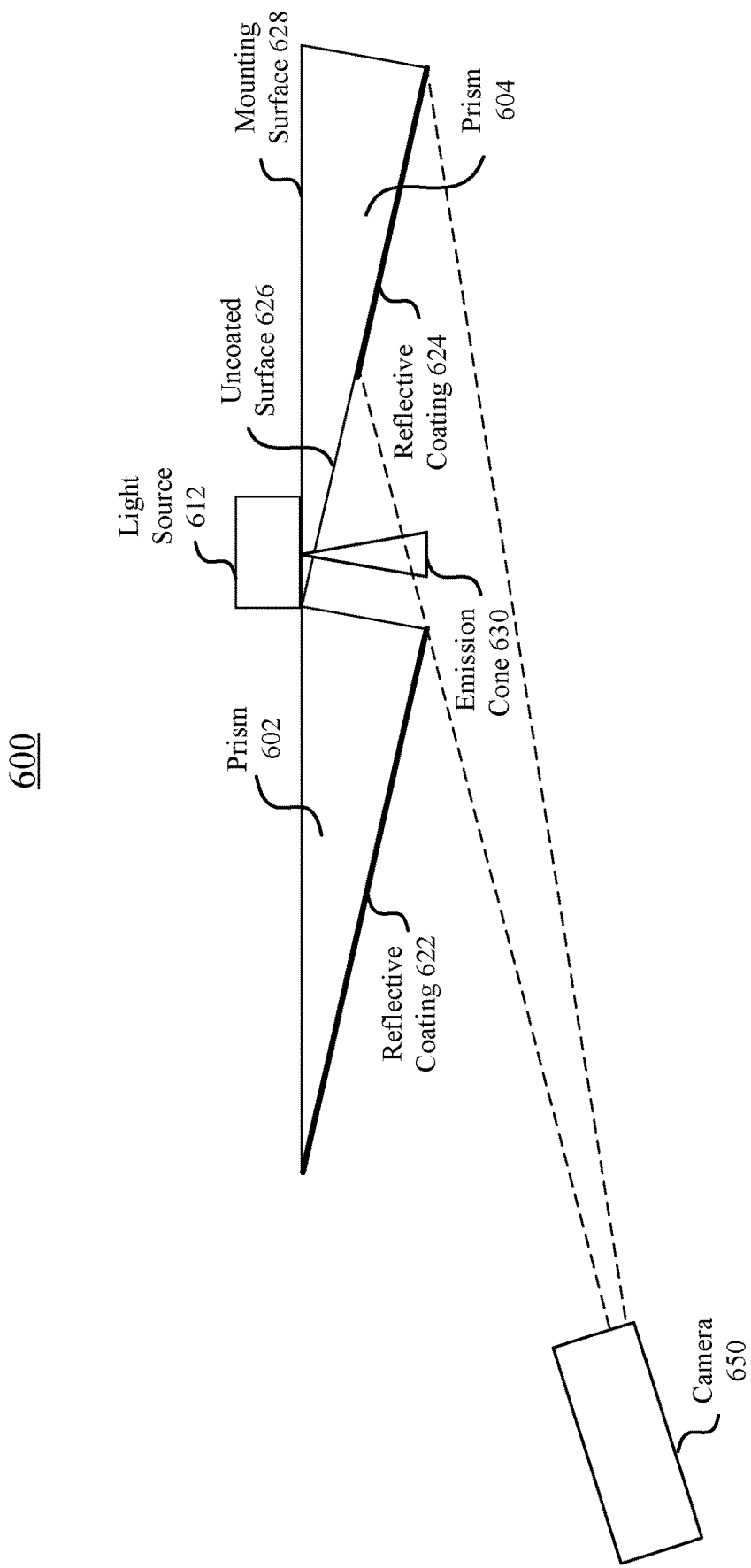
FIG. 6 is a simplified diagram of an example system for eye tracking in an example near-eye display, according to certain embodiments.

FIG. 6 is a simplified diagram of an example system 600 for eye tracking in an example near-eye display, according to certain embodiments. FIG. 6 is merely illustrative and is not drawn to scale. System 600 may include a light source 612 that may be mounted on a mounting surface 628 of a prism 604. Light source 612 may be mounted on mounting surface 628 in any suitable manner, such as die bonding. Light source 612 may be positioned within a field of view of an eye of a user. As discussed above, light source 612 may have a very small form factor, such as less than 200 µm, such that light source 612 is effectively invisible to the user. Light source 612 may have an emission cone 630 with an angle that is less than 30°.

System 600 may also include a prism 602 on which a reflective coating 622 is formed. Reflective coating 622 may be configured to shadow light source 612 from a field of view of camera 650. Shadowing light from light source 612 and preventing it from directly reaching camera 650 is advantageous for contrast, image quality, and the signal-to-noise ratio for the image processing phase of eye-tracking. Without shadowing light from light source 612, camera 650 may be subject to unnecessary stray light.

Reflective coating 622 may include multiple layers of dielectric materials that are formed on a surface of prism 602. Reflective coating 622 may be formed by a directional coating process, such as electron beam deposition, ion beam deposition, or atomic layer deposition. A source for the deposition material may be positioned at the location of camera 650. During deposition, prism 602 shadows a portion of prism 604, such that an uncoated surface 626 of prism 604 remains, while a reflective coating 624 is deposited on an unshadowed portion of prism 604. Light source 612 may be positioned such that emitted light travels through uncoated surface 626 of prism 604. Emission cone 630 may be narrow enough that emitted light propagates between reflective coatings 622 and 624, and is not incident on reflective coatings 622 or 624, thereby preventing stray light from being reflected toward mounting surface 628. Further, reflective coating 622 prevents light from light source 612 from reaching camera 650 directly, thereby preventing noise in the captured images of the eye of the user and misidentification of features of the eye of the user.

Light source 612 may be configured to emit light toward the eye of the user. The light may then be reflected by the eye of the user toward reflective coating 624, which further reflects the light toward camera 650. Reflective coating 624 may be tilted at an angle such that the reflected light reaches camera 650. If multiple light sources and multiple corresponding reflective coatings are used, each reflective coating may be tilted at a different angle to reflect light from the eye of the user toward camera 650.

Reflective coatings 622 and 624 may be hot mirror coatings that reflect near infrared light and transmit visible light. Further, reflective coatings 622 and 624 may be formed on a flat surface of prisms 602 and 604, respectively. A Fresnel lens may be formed on each flat surface in order to focus the reflected light. Alternatively, reflective coatings 622 and 624 may be formed on a curved surface of prisms 602 and 604, respectively. The curved surface may include a concave surface, a convex surface, a cylindrical surface, an aspherical surface, and/or a freeform surface.

Figure 7:
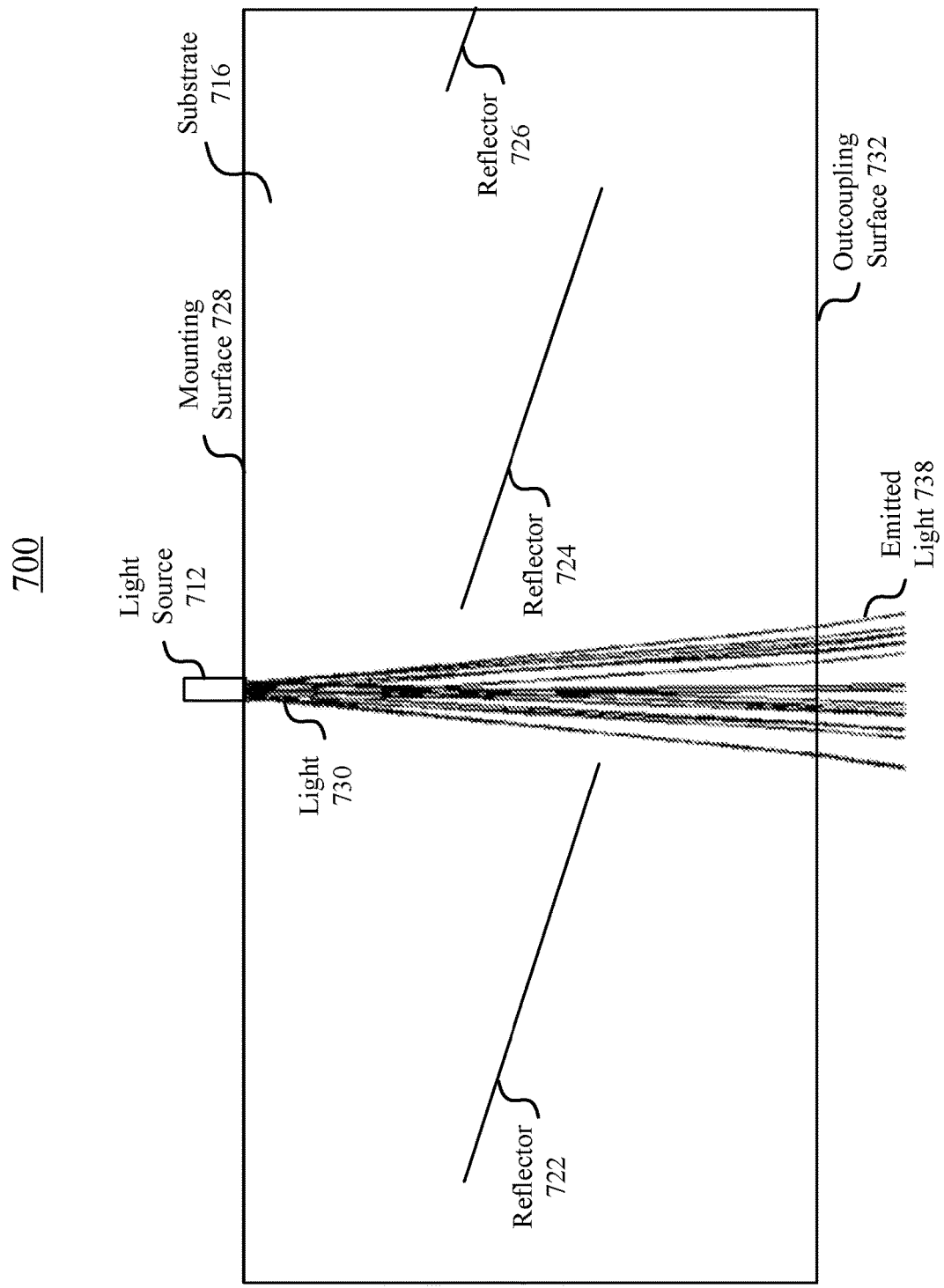
FIG. 7 is a simplified diagram of an example illumination system for eye tracking in an example near-eye display, according to certain embodiments.

FIG. 7 is a simplified diagram of an example illumination system 700 for eye tracking in an example near-eye display, according to certain embodiments. FIG. 7 is merely illustrative and is not drawn to scale. Illumination system 700 may include a light source 712 that may be mounted on a mounting surface 728 of a substrate 716. Light source 712 may be mounted on mounting surface 728 in any suitable manner, such as die bonding. Light source 712 may be positioned within a field of view of an eye of a user. As discussed above, light source 712 may have a very small form factor, such as less than 200 µm, such that light source 712 is effectively invisible to the user. Substrate 716 may be made of any suitable material that is transparent to visible and near infrared light, such as glass, quartz, plastic, polymer, ceramic, or crystal.

System 700 may also include reflectors 722, 724, and 726. Reflector 722 may be configured to shadow light source 712 from a field of view of a camera (not shown). Reflectors 722, 724, and 726 may be formed in a similar manner as described above with regard to FIG. 6. Alternatively, reflectors 722, 724, and 726 may be formed in any suitable manner, and may be standalone mirrors, dielectric stacks, reflective coatings, or any other reflective material. Reflectors 722, 724, and 726 may be Fresnel reflectors.

Light source 712 may be positioned such that emitted light travels between reflectors 722 and 724, and is not incident on reflective coatings 722 or 724, thereby preventing stray light from being reflected toward mounting surface 728. Further, reflector 722 prevents light from light source 712 from reaching the camera directly, thereby preventing noise in the captured images of the eye of the user.

Light source 712 may be configured to emit light toward the eye of the user. The emitted light 738 may propagate through an outcoupling surface 732, and may then be reflected by the eye of the user toward reflector 724, which further reflects the light toward the camera. Reflector 724 may be tilted at an angle such that the reflected light reaches the camera. If multiple light sources and multiple corresponding reflective coatings are used, each reflective coating may be tilted at a different angle to reflect light from the eye of the user toward the camera.

Reflectors 722 and 724 may be hot mirror coatings that reflect near infrared light and transmit visible light. Further, reflectors 722 and 724 may be formed on a flat surface of prisms within substrate 716. A Fresnel lens may be formed on each flat surface in order to focus the reflected light. Alternatively, reflectors 722 and 724 may be formed on a curved surface of prisms within substrate 716. The curved surface may include a concave surface, a convex surface, a cylindrical surface, an aspherical surface, and/or a freeform surface. In the example shown in FIG. 7, reflector 724 is formed by coating approximately 80% of the surface of a prism with a hot mirror coating.

FIGS. 8A-8C are simplified diagrams of example illumination systems 800, 801, and 802 for eye tracking in example near-eye displays, according to certain embodiments. FIGS. 8A-8C are merely illustrative and are not drawn to scale. FIGS. 8A-8C illustrate the use of beam diverting components to direct light from a light source toward the eye of the user. In the examples shown in FIGS. 8A-8C, the beam diverting components may be indented prisms or cones that are formed at an outcoupling surface of a substrate. Alternatively or in addition, the beam diverting components may be diffraction gratings or lenses that are formed at the outcoupling surface of the substrate.

As shown in FIG. 8A, illumination system 800 may include a light source 812 that may be mounted on a mounting surface 828 of a substrate 816. Light source 812 may be mounted on mounting surface 828 in any suitable manner, such as die bonding. Light source 812 may be positioned within a field of view of an eye of a user. As discussed above, light source 812 may have a very small form factor, such as less than 200 μm, such that light source 812 is effectively invisible to the user. Substrate 816 may be made of any suitable material that is transparent to visible and near infrared light, such as glass, quartz, plastic, polymer, ceramic, or crystal.

Illumination system 800 may also include reflectors 822 and 824. Reflector 822 may be configured to shadow light source 812 from a field of view of a camera (not shown). Reflectors 822 and 824 may be formed in a similar manner as described above with regard to FIG. 6. Alternatively, reflectors 822 and 824 may be formed in any suitable manner, and may be standalone mirrors, dielectric stacks, reflective coatings, or any other reflective material. Reflectors 822 and 824 may be Fresnel reflectors.

Light source 812 may be positioned such that a first portion of light 830 travels between reflectors 822 and 824, a second portion of light 830 is transmitted by reflector 822 toward outcoupling surface 832, and a third portion of light 830 is reflected by reflector 822 toward reflector 824. Some of the third portion of light 830 passes through reflector 824 and is transmitted through mounting surface 828 as stray light 834. The rest of the third portion of light 830 is reflected by reflector 824 toward outcoupling surface 832. Reflector 822 may prevent light from light source 812 from reaching the camera directly, thereby preventing noise in the captured images of the eye of the user.

The spacing between reflectors 822 and 824 may be adjusted to optimize image quality. For optimal imaging conditions, reflectors 822 and 824 may be as close to each other as possible. However, if reflectors 822 and 824 are too close to each other, some of the light may be lost due to multi-path reflections from reflectors 822 and 824. Also, this configuration may lead to stray light 834, as shown in FIG. 8A. On the other hand, for optimal illumination conditions, reflectors 822 and 824 may be as far from each other as possible. However, if reflectors 822 and 824 are too far apart, there may be a loss of signal in the imaging path for the light reflected by the eye and incident on the camera. Accordingly, a compromise may be reached that optimizes the overall quality of the image produced by the camera.

Indented prism 836 may be used as a beam diverting component to redirect light from light source 812 toward the eye of the user. Indented prism 836 may be formed at outcoupling surface 832 of substrate 816 by any suitable method, such as gray-scale lithography. A shape of indented prism 836 may be configured to provide an amount of tilt such that emitted light 838 reaches the eye of the user.

The emitted light 838 may propagate through outcoupling surface 832, and may then be reflected by the eye of the user toward reflector 824, which further reflects the light toward the camera. Reflector 824 may be tilted at an angle such that the reflected light reaches the camera. If multiple light sources and multiple corresponding reflective coatings are used, each reflective coating may be tilted at a different angle to reflect light from the eye of the user toward the camera.

Reflectors 822 and 824 may be hot mirror coatings that reflect near infrared light and transmit visible light. Further, reflectors 822 and 824 may be formed on a flat surface of prisms within substrate 816. A Fresnel lens may be formed on each flat surface in order to focus the reflected light. Alternatively, reflectors 822 and 824 may be formed on a curved surface of prisms within substrate 816. The curved surface may include a concave surface, a convex surface, a cylindrical surface, an aspherical surface, and/or a freeform surface.

As shown in FIG. 8B, illumination system 801 may include a light source 842 that may be mounted on a mounting surface 858 of a substrate 846. Light source 842 may be mounted on mounting surface 858 in any suitable manner, such as die bonding. Light source 842 may be positioned within a field of view of an eye of a user. As discussed above, light source 842 may have a very small form factor, such as less than 200 μm, such that light source 842 is effectively invisible to the user. Substrate 846 may be made of any suitable material that is transparent to visible and near infrared light, such as glass, quartz, plastic, polymer, ceramic, or crystal.

Illumination system 801 may also include reflectors 852 and 854. Reflector 852 may be configured to shadow light source 842 from a field of view of a camera (not shown). Reflectors 852 and 854 may be formed in a similar manner as described above with regard to FIG. 6. Alternatively, reflectors 852 and 854 may be formed in any suitable manner, and may be standalone mirrors, dielectric stacks, reflective coatings, or any other reflective material. Reflectors 852 and 854 may be Fresnel reflectors.

Light source 842 may be positioned such that a first portion of light 860 travels between reflectors 852 and 854, a second portion of light 860 is transmitted by reflector 852 toward outcoupling surface 862, and a third portion of light 860 is reflected by reflector 852 toward reflector 854. Some of the third portion of light 860 passes through reflector 854 and is transmitted through mounting surface 858 as stray light 864. The rest of the third portion of light 860 is reflected by reflector 854 toward outcoupling surface 852. Reflector 852 may prevent light from light source 842 from reaching the camera directly, thereby preventing noise in the captured images of the eye of the user.

The spacing between reflectors 852 and 854 may be adjusted to optimize image quality. For optimal imaging conditions, reflectors 852 and 854 may be as close to each other as possible. However, if reflectors 852 and 854 are too close to each other, some of the light may be lost due to multi-path reflections from reflectors 852 and 854. Also, this configuration may lead to stray light 864, as shown in FIG. 8B. On the other hand, for optimal illumination conditions, reflectors 852 and 854 may be as far from each other as possible. However, if reflectors 852 and 854 are too far apart, there may be a loss of signal in the imaging path for the light reflected by the eye and incident on the camera. Accordingly, a compromise may be reached that optimizes the overall quality of the image produced by the camera.

Indented prism 866 may be used as a beam diverting component to redirect light from light source 842 toward the eye of the user. Indented prism 866 may be formed at outcoupling surface 862 of substrate 846 by any suitable method, such as gray-scale lithography. A shape of indented prism 866 may be configured to provide an amount of tilt such that emitted light 868 reaches the eye of the user. As shown in FIG. 8B, indented prism 866 provides a greater amount of tilt than indented prism 836.

The emitted light 868 may propagate through outcoupling surface 862, and may then be reflected by the eye of the user toward reflector 854, which further reflects the light toward the camera. Reflector 854 may be tilted at an angle such that the reflected light reaches the camera. If multiple light sources and multiple corresponding reflective coatings are used, each reflective coating may be tilted at a different angle to reflect light from the eye of the user toward the camera.

Reflectors 852 and 854 may be hot mirror coatings that reflect near infrared light and transmit visible light. Further, reflectors 852 and 854 may be formed on a flat surface of prisms within substrate 846. A Fresnel lens may be formed on each flat surface in order to focus the reflected light. Alternatively, reflectors 852 and 854 may be formed on a curved surface of prisms within substrate 846. The curved surface may include a concave surface, a convex surface, a cylindrical surface, an aspherical surface, and/or a freeform surface.

As shown in FIG. 8C, illumination system 802 may include a light source 872 that may be mounted on a mounting surface 888 of a substrate 876. Light source 872 may be mounted on mounting surface 888 in any suitable manner, such as die bonding. Light source 872 may be positioned within a field of view of an eye of a user. As discussed above, light source 872 may have a very small form factor, such as less than 200 μm, such that light source 872 is effectively invisible to the user. Substrate 876 may be made of any suitable material that is transparent to visible and near infrared light, such as glass, quartz, plastic, polymer, ceramic, or crystal.

Illumination system 802 may also include reflectors 882 and 884. Reflector 882 may be configured to shadow light source 872 from a field of view of a camera (not shown). Reflectors 882 and 884 may be formed in a similar manner as described above with regard to FIG. 6. Alternatively, reflectors 882 and 884 may be formed in any suitable manner, and may be standalone mirrors, dielectric stacks, reflective coatings, or any other reflective material. Reflectors 882 and 884 may be Fresnel reflectors.

Light source 872 may be positioned such that a first portion of light 890 travels between reflectors 882 and 884, a second portion of light 890 is transmitted by reflector 882 toward outcoupling surface 892, and a third portion of light 890 is reflected by reflector 882 toward reflector 884. Some of the third portion of light 890 passes through reflector 884 and is transmitted through mounting surface 888 as stray light 894. The rest of the third portion of light 890 is reflected by reflector 884 toward outcoupling surface 882. Reflector 882 may prevent light from light source 872 from reaching the camera directly, thereby preventing noise in the captured images of the eye of the user.

The spacing between reflectors 882 and 884 may be adjusted to optimize image quality. For optimal imaging conditions, reflectors 882 and 884 may be as close to each other as possible. However, if reflectors 882 and 884 are too close to each other, some of the light may be lost due to multi-path reflections from reflectors 882 and 884. Also, this configuration may lead to stray light 894, as shown in FIG. 8C. On the other hand, for optimal illumination conditions, reflectors 882 and 884 may be as far from each other as possible. However, if reflectors 882 and 884 are too far apart, there may be a loss of signal in the imaging path for the light reflected by the eye and incident on the camera. Accordingly, a compromise may be reached that optimizes the overall quality of the image produced by the camera.

Indented prism 896 may be used as a beam diverting component to redirect light from light source 872 toward the eye of the user. Indented prism 896 may be formed at outcoupling surface 892 of substrate 876 by any suitable method, such as gray-scale lithography. A shape of indented prism 896 may be configured to provide an amount of tilt such that emitted light 898 reaches the eye of the user. As shown in FIG. 8C, indented prism 896 provides a greater amount of tilt than indented prisms 836 and 866.

The emitted light 898 may propagate through outcoupling surface 892, and may then be reflected by the eye of the user toward reflector 884, which further reflects the light toward the camera. Reflector 884 may be tilted at an angle such that the reflected light reaches the camera. If multiple light sources and multiple corresponding reflective coatings are used, each reflective coating may be tilted at a different angle to reflect light from the eye of the user toward the camera.

Reflectors 882 and 884 may be hot mirror coatings that reflect near infrared light and transmit visible light. Further, reflectors 882 and 884 may be formed on a flat surface of prisms within substrate 876. A Fresnel lens may be formed on each flat surface in order to focus the reflected light. Alternatively, reflectors 882 and 884 may be formed on a curved surface of prisms within substrate 876. The curved surface may include a concave surface, a convex surface, a cylindrical surface, an aspherical surface, and/or a freeform surface.

Figures 9A, 9B, 9C:
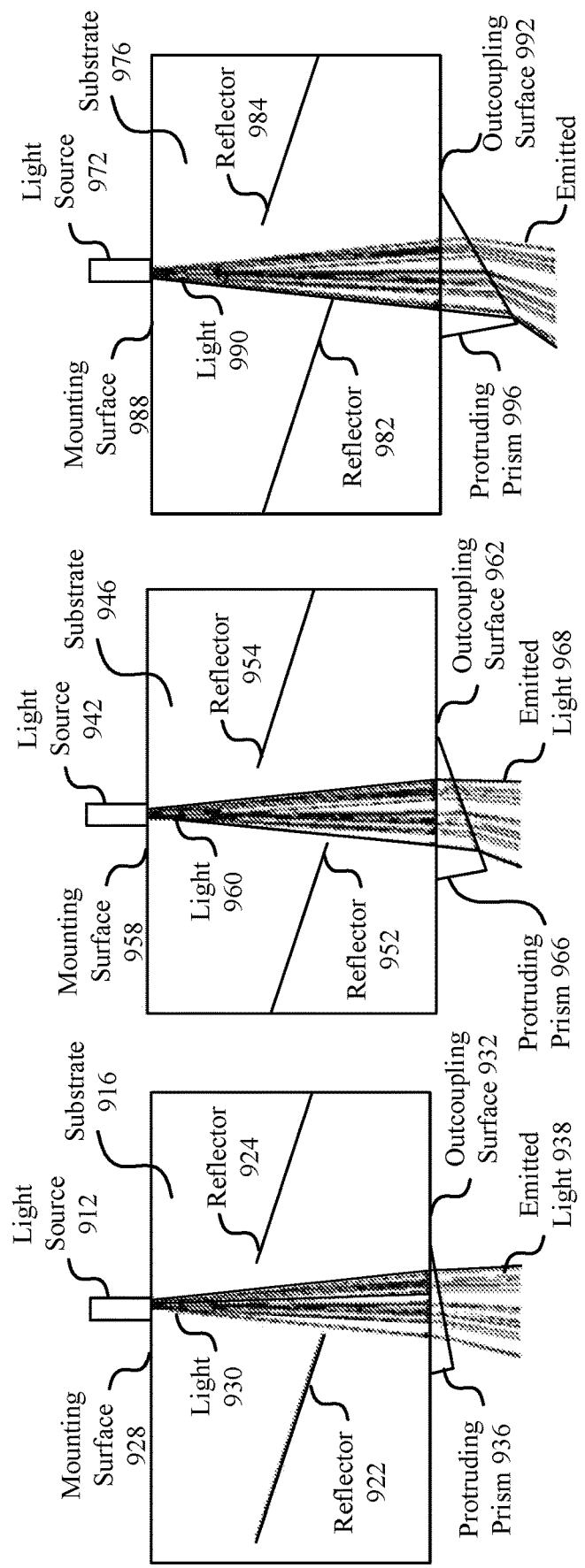
FIGS. 9A-9C are simplified diagrams of example illumination systems for eye tracking in example near-eye displays, according to certain embodiments.

FIGS. 9A-9C are simplified diagrams of example illumination systems 900, 901, and 902 for eye tracking in example near-eye displays, according to certain embodiments. FIGS. 9A-9C are merely illustrative and are not drawn to scale. FIGS. 9A-9C illustrate the use of beam diverting components to direct light from a light source toward the eye of the user. In the examples shown in FIGS. 9A-9C, the beam diverting components may be protruding prisms or cones that are formed at an outcoupling surface of a substrate.

As shown in FIG. 9A, illumination system 900 may include a light source 912 that may be mounted on a mounting surface 928 of a substrate 916. Light source 912 may be mounted on mounting surface 928 in any suitable manner, such as die bonding. Light source 912 may be positioned within a field of view of an eye of a user. As discussed above, light source 912 may have a very small form factor, such as less than 200 µm, such that light source 912 is effectively invisible to the user. Substrate 916 may be made of any suitable material that is transparent to visible and near infrared light, such as glass, quartz, plastic, polymer, ceramic, or crystal.

Illumination system 900 may also include reflectors 922 and 924. Reflector 922 may be configured to shadow light source 912 from a field of view of a camera (not shown). Reflectors 922 and 924 may be formed in a similar manner as described above with regard to FIG. 6. Alternatively, reflectors 922 and 924 may be formed in any suitable manner, and may be standalone mirrors, dielectric stacks, reflective coatings, or any other reflective material. Reflectors 922 and 924 may be Fresnel reflectors.

Light source 912 may be positioned such that light 930 travels between reflectors 922 and 924, and is not incident on reflectors 922 or 924, thereby preventing stray light from being reflected toward mounting surface 928. Further, reflector 922 prevents light from light source 912 from reaching the camera directly, thereby preventing noise in the captured images of the eye of the user.

Protruding prism 936 may be used as a beam diverting component to redirect light from light source 912 toward the eye of the user. Protruding prism 936 may be formed at outcoupling surface 932 of substrate 916 by any suitable method, such as any suitable deposition method. A shape of protruding prism 936 may be configured to provide an amount of tilt such that emitted light 938 reaches the eye of the user.

The emitted light 938 may be reflected by the eye of the user toward reflector 924, which further reflects the light toward the camera. Reflector 924 may be tilted at an angle such that the reflected light reaches the camera. If multiple light sources and multiple corresponding reflective coatings are used, each reflective coating may be tilted at a different angle to reflect light from the eye of the user toward the camera.

Reflectors 922 and 924 may be hot mirror coatings that reflect near infrared light and transmit visible light. Further, reflectors 922 and 924 may be formed on a flat surface of prisms within substrate 916. A Fresnel lens may be formed on each flat surface in order to focus the reflected light. Alternatively, reflectors 922 and 924 may be formed on a curved surface of prisms within substrate 916. The curved surface may include a concave surface, a convex surface, a cylindrical surface, an aspherical surface, and/or a freeform surface.

As shown in FIG. 9B, illumination system 901 may include a light source 942 that may be mounted on a mounting surface 958 of a substrate 946. Light source 942 may be mounted on mounting surface 958 in any suitable manner, such as die bonding. Light source 942 may be positioned within a field of view of an eye of a user. As discussed above, light source 942 may have a very small form factor, such as less than 200 µm, such that light source 942 is effectively invisible to the user. Substrate 946 may be made of any suitable material that is transparent to visible and near infrared light, such as glass, quartz, plastic, polymer, ceramic, or crystal.

Illumination system 901 may also include reflectors 952 and 954. Reflector 952 may be configured to shadow light source 942 from a field of view of a camera (not shown). Reflectors 952 and 954 may be formed in a similar manner as described above with regard to FIG. 6. Alternatively, reflectors 952 and 954 may be formed in any suitable manner, and may be standalone mirrors, dielectric stacks, reflective coatings, or any other reflective material. Reflectors 952 and 954 may be Fresnel reflectors.

Light source 942 may be positioned such that light 960 travels between reflectors 952 and 954, and is not incident on reflectors 952 or 954, thereby preventing stray light from being reflected toward mounting surface 958. Further, reflector 952 prevents light from light source 942 from reaching the camera directly, thereby preventing noise in the captured images of the eye of the user.

Protruding prism 966 may be used as a beam diverting component to redirect light from light source 942 toward the eye of the user. Protruding prism 966 may be formed at outcoupling surface 962 of substrate 946 by any suitable method, such as any suitable deposition method. A shape of protruding prism 966 may be configured to provide an amount of tilt such that emitted light 968 reaches the eye of the user. As shown in FIG. 9B, protruding prism 966 provides a greater amount of tilt than protruding prism 936.

The emitted light 968 may be reflected by the eye of the user toward reflector 954, which further reflects the light toward the camera. Reflector 954 may be tilted at an angle such that the reflected light reaches the camera. If multiple light sources and multiple corresponding reflective coatings are used, each reflective coating may be tilted at a different angle to reflect light from the eye of the user toward the camera.

Reflectors 952 and 954 may be hot mirror coatings that reflect near infrared light and transmit visible light. Further, reflectors 952 and 954 may be formed on a flat surface of prisms within substrate 946. A Fresnel lens may be formed on each flat surface in order to focus the reflected light. Alternatively, reflectors 952 and 954 may be formed on a curved surface of prisms within substrate 946. The curved surface may include a concave surface, a convex surface, a cylindrical surface, an aspherical surface, and/or a freeform surface.

As shown in FIG. 9C, illumination system 902 may include a light source 972 that may be mounted on a mounting surface 988 of a substrate 976. Light source 972 may be mounted on mounting surface 988 in any suitable manner, such as die bonding. Light source 972 may be positioned within a field of view of an eye of a user. As discussed above, light source 972 may have a very small form factor, such as less than 200 µm, such that light source 972 is effectively invisible to the user. Substrate 976 may be made of any suitable material that is transparent to visible and near infrared light, such as glass, quartz, plastic, polymer, ceramic, or crystal.

Illumination system 902 may also include reflectors 982 and 984. Reflector 982 may be configured to shadow light source 972 from a field of view of a camera (not shown). Reflectors 982 and 984 may be formed in a similar manner as described above with regard to FIG. 6. Alternatively, reflectors 982 and 984 may be formed in any suitable manner, and may be standalone mirrors, dielectric stacks, reflective coatings, or any other reflective material. Reflectors 982 and 984 may be Fresnel reflectors.

Light source 972 may be positioned such that light 990 travels between reflectors 982 and 984, and is not incident on reflectors 982 or 984, thereby preventing stray light from being reflected toward mounting surface 988. Further, reflector 982 prevents light from light source 972 from reaching the camera directly, thereby preventing noise in the captured images of the eye of the user.

Protruding prism 996 may be used as a beam diverting component to redirect light from light source 972 toward the eye of the user. Protruding prism 996 may be formed at outcoupling surface 992 of substrate 976 by any suitable method, such as any suitable deposition method. A shape of protruding prism 996 may be configured to provide an amount of tilt such that emitted light 968 reaches the eye of the user. As shown in FIG. 9C, protruding prism 996 provides a greater amount of tilt than protruding prisms 936 and 966.

The emitted light 998 may be reflected by the eye of the user toward reflector 984, which further reflects the light toward the camera. Reflector 984 may be tilted at an angle such that the reflected light reaches the camera. If multiple light sources and multiple corresponding reflective coatings are used, each reflective coating may be tilted at a different angle to reflect light from the eye of the user toward the camera.

Reflectors 982 and 984 may be hot mirror coatings that reflect near infrared light and transmit visible light. Further, reflectors 982 and 984 may be formed on a flat surface of prisms within substrate 976. A Fresnel lens may be formed on each flat surface in order to focus the reflected light. Alternatively, reflectors 982 and 984 may be formed on a curved surface of prisms within substrate 976. The curved surface may include a concave surface, a convex surface, a cylindrical surface, an aspherical surface, and/or a freeform surface.

Figures 10A, 10B, 10C:
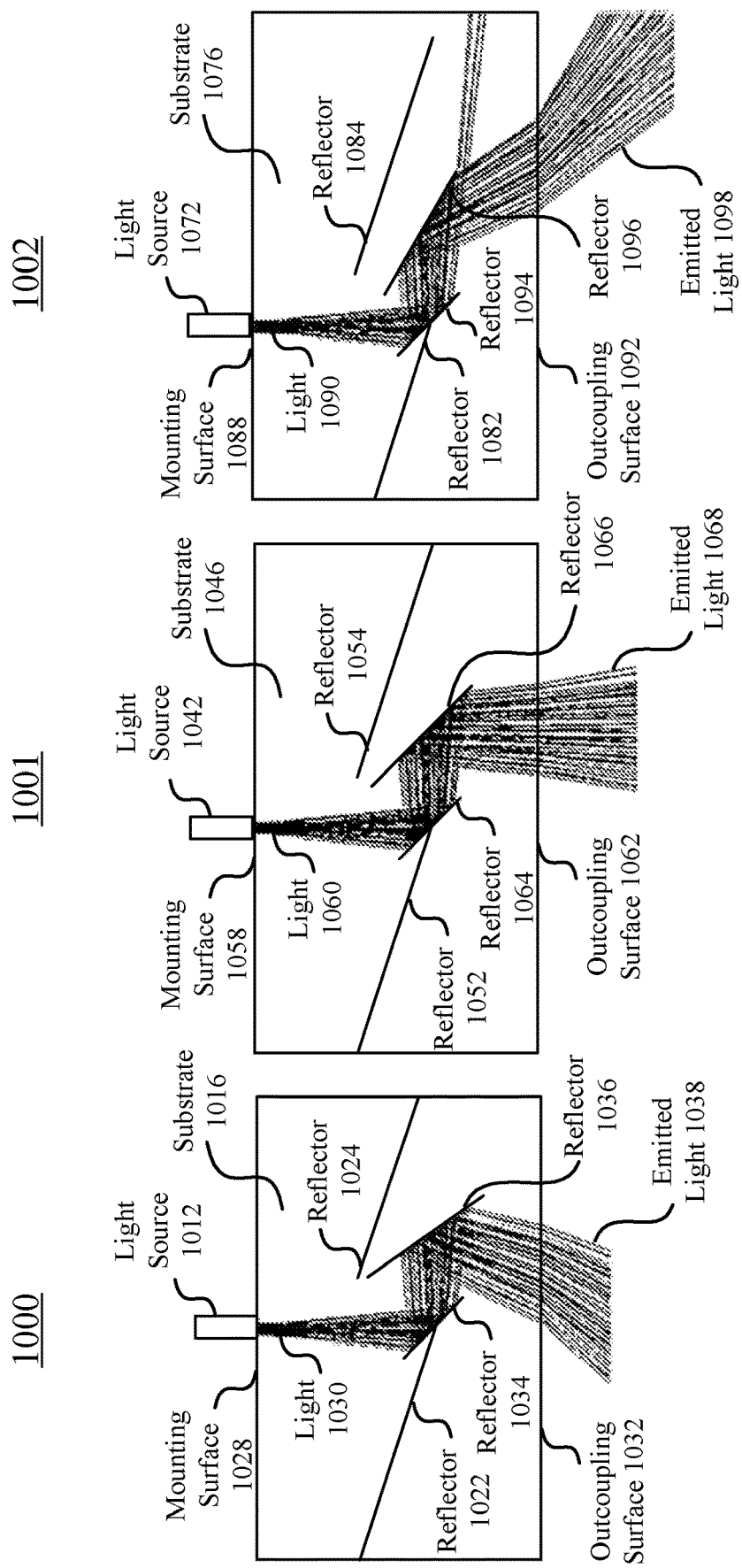
FIGS. 10A-10C are simplified diagrams of example illumination systems for eye tracking in example near-eye displays, according to certain embodiments.

FIGS. 10A-10C are simplified diagrams of example illumination systems 1000, 1001, and 1002 for eye tracking in example near-eye displays, according to certain embodiments. FIGS. 10A-10C are merely illustrative and are not drawn to scale. FIGS. 10A-10C illustrate the use of beam diverting components to direct light from a light source toward the eye of the user. In the examples shown in FIGS. 10A-10C, the beam diverting components may be reflectors that are formed within a substrate. Although FIGS. 10A-10C show that the beam diverting components are made of two reflectors, the beam diverting components may instead be made of a single reflector or any suitable number of reflectors. The beam diverting components may reflect light from a surface that is coated, or by total internal reflection. The beam diverting components may include any combination of reflectors, prisms, lenses, and/or diffraction gratings.

As shown in FIG. 10A, illumination system 1000 may include a light source 1012 that may be mounted on a mounting surface 1028 of a substrate 1016. Light source 1012 may be mounted on mounting surface 1028 in any suitable manner, such as die bonding. Light source 1012 may be positioned within a field of view of an eye of a user. As discussed above, light source 1012 may have a very small form factor, such as less than 200 µm, such that light source 1012 is effectively invisible to the user. Substrate 1016 may be made of any suitable material that is transparent to visible and near infrared light, such as glass, quartz, plastic, polymer, ceramic, or crystal.

Illumination system 1000 may also include reflectors 1022 and 1024. Reflector 1022 may be configured to shadow light source 1012 from a field of view of a camera (not shown). Reflectors 1022 and 1024 may be formed in a similar manner as described above with regard to FIG. 6. Alternatively, reflectors 1022 and 1024 may be formed in any suitable manner, and may be standalone mirrors, dielectric stacks, reflective coatings, or any other reflective material. Reflectors 1022 and 1024 may be Fresnel reflectors.

Reflectors 1034 and 1036 may be used as beam diverting components to redirect light from light source 1012 toward the eye of the user. Reflectors 1034 and 1036 may be formed in a similar manner as described above with regard to FIG. 6. For example, reflectors 1034 and 1036 may be formed as reflective coatings on prisms, and may be formed at the same time that reflectors 1022 and 1024 are formed. Alternatively, reflectors 1034 and 1036 may be formed in any suitable manner, and may be standalone mirrors, dielectric stacks, reflective coatings, or any other reflective material. For example, reflectors 1034 and 1036 may be deposited or diamond turned directly onto edge facets of reflectors 1022 and 1024, respectively. Reflectors 1034 and 1036 may be angled to provide an amount of tilt such that emitted light 1038 reaches the eye of the user.

Light source 1012 may be positioned such that light 1030 is incident on reflector 1034, and is not incident on reflectors 1022 or 1024, thereby preventing stray light from being reflected toward mounting surface 1028. Further, reflector 1022 prevents light from light source 1012 from reaching the camera directly, thereby preventing noise in the captured images of the eye of the user. Light 1030 is reflected by reflector 1034 toward reflector 1036, and is further reflected by reflector 1036 toward outcoupling surface 1032.

The emitted light 1038 may be reflected by the eye of the user toward reflector 1024, which further reflects the light toward the camera. Reflector 1024 may be tilted at an angle such that the reflected light reaches the camera. If multiple light sources and multiple corresponding reflective coatings are used, each reflective coating may be tilted at a different angle to reflect light from the eye of the user toward the camera. Although reflector 1036 may be in the field of view of the camera, reflector 1036 may be small enough that it will be nearly invisible to the camera. For example, reflector 1036 may only appear in a single pixel of the focal plane array of the camera. Reflector 1036 may have a maximum linear dimension of 100 µm or less.

Reflectors 1022 and 1024 may be hot mirror coatings that reflect near infrared light and transmit visible light. Further, reflectors 1022 and 1024 may be formed on a flat surface of prisms within substrate 1016. A Fresnel lens may be formed on each flat surface in order to focus the reflected light. Alternatively, reflectors 1022 and 1024 may be formed on a curved surface of prisms within substrate 1016. The curved surface may include a concave surface, a convex surface, a cylindrical surface, an aspherical surface, and/or a freeform surface.

As shown in FIG. 10B, illumination system 1001 may include a light source 1042 that may be mounted on a mounting surface 1058 of a substrate 1046. Light source 1042 may be mounted on mounting surface 1058 in any suitable manner, such as die bonding. Light source 1042 may be positioned within a field of view of an eye of a user. As discussed above, light source 1042 may have a very small form factor, such as less than 200 µm, such that light source 1042 is effectively invisible to the user. Substrate 1046 may be made of any suitable material that is transparent to visible and near infrared light, such as glass, quartz, plastic, polymer, ceramic, or crystal.

Illumination system 1001 may also include reflectors 1052 and 1054. Reflector 1052 may be configured to shadow light source 1042 from a field of view of a camera (not shown). Reflectors 1052 and 1054 may be formed in a similar manner as described above with regard to FIG. 6. Alternatively, reflectors 1052 and 1054 may be formed in any suitable manner, and may be standalone mirrors, dielectric stacks, reflective coatings, or any other reflective material. Reflectors 1052 and 1054 may be Fresnel reflectors.

Reflectors 1064 and 1066 may be used as beam diverting components to redirect light from light source 1042 toward the eye of the user. Reflectors 1064 and 1066 may be formed in a similar manner as described above with regard to FIG. 6. For example, reflectors 1064 and 1066 may be formed as reflective coatings on prisms, and may be formed at the same time that reflectors 1052 and 1054 are formed. Alternatively, reflectors 1064 and 1066 may be formed in any suitable manner, and may be standalone mirrors, dielectric stacks, reflective coatings, or any other reflective material. For example, reflectors 1064 and 1066 may be deposited or diamond turned directly onto edge facets of reflectors 1052 and 1054, respectively. Reflectors 1064 and 1066 may be angled to provide an amount of tilt such that emitted light 1068 reaches the eye of the user. As shown in FIG. 10B, reflector 1066 provides a lesser amount of tilt than reflector 1036.

Light source 1042 may be positioned such that light 1060 is incident on reflector 1064, and is not incident on reflectors 1052 or 1054, thereby preventing stray light from being reflected toward mounting surface 1058. Further, reflector 1052 prevents light from light source 1042 from reaching the camera directly, thereby preventing noise in the captured images of the eye of the user. Light 1060 is reflected by reflector 1064 toward reflector 1066, and is further reflected by reflector 1066 toward outcoupling surface 1062.

The emitted light 1068 may be reflected by the eye of the user toward reflector 1054, which further reflects the light toward the camera. Reflector 1054 may be tilted at an angle such that the reflected light reaches the camera. If multiple light sources and multiple corresponding reflective coatings are used, each reflective coating may be tilted at a different angle to reflect light from the eye of the user toward the camera. Although reflector 1066 may be in the field of view of the camera, reflector 1066 may be small enough that it will be nearly invisible to the camera. For example, reflector 1066 may only appear in a single pixel of the focal plane array of the camera. Reflector 1066 may have a maximum linear dimension of 100 µm or less.

Reflectors 1052 and 1054 may be hot mirror coatings that reflect near infrared light and transmit visible light. Further, reflectors 1052 and 1054 may be formed on a flat surface of prisms within substrate 1046. A Fresnel lens may be formed on each flat surface in order to focus the reflected light. Alternatively, reflectors 1052 and 1054 may be formed on a curved surface of prisms within substrate 1046. The curved surface may include a concave surface, a convex surface, a cylindrical surface, an aspherical surface, and/or a freeform surface.

As shown in FIG. 10C, illumination system 1002 may include a light source 1072 that may be mounted on a mounting surface 1088 of a substrate 1076. Light source 1072 may be mounted on mounting surface 1088 in any suitable manner, such as die bonding. Light source 1072 may be positioned within a field of view of an eye of a user. As discussed above, light source 1072 may have a very small form factor, such as less than 200 µm, such that light source 1072 is effectively invisible to the user. Substrate 1076 may be made of any suitable material that is transparent to visible and near infrared light, such as glass, quartz, plastic, polymer, ceramic, or crystal.

Illumination system 1002 may also include reflectors 1082 and 1084. Reflector 1082 may be configured to shadow light source 1072 from a field of view of a camera (not shown). Reflectors 1082 and 1084 may be formed in a similar manner as described above with regard to FIG. 6. Alternatively, reflectors 1082 and 1084 may be formed in any suitable manner, and may be standalone mirrors, dielectric stacks, reflective coatings, or any other reflective material. Reflectors 1082 and 1084 may be Fresnel reflectors.

Reflectors 1094 and 1096 may be used as beam diverting components to redirect light from light source 1072 toward the eye of the user. Reflectors 1094 and 1096 may be formed in a similar manner as described above with regard to FIG. 6. For example, reflectors 1094 and 1096 may be formed as reflective coatings on prisms, and may be formed at the same time that reflectors 1082 and 1084 are formed. Alternatively, reflectors 1094 and 1096 may be formed in any suitable manner, and may be standalone mirrors, dielectric stacks, reflective coatings, or any other reflective material. For example, reflectors 1094 and 1096 may be deposited or diamond turned directly onto edge facets of reflectors 1082 and 1084, respectively. Reflectors 1094 and 1096 may be angled to provide an amount of tilt such that emitted light 1098 reaches the eye of the user. As shown in FIG. 10C, reflector 1096 provides a greater amount of tilt than reflectors 1036 and 1066.

Light source 1072 may be positioned such that light 1090 is incident on reflector 1094, and is not incident on reflectors 1082 or 1084, thereby preventing stray light from being reflected toward mounting surface 1088. Further, reflector 1082 prevents light from light source 1072 from reaching the camera directly, thereby preventing noise in the captured images of the eye of the user. Light 1090 is reflected by reflector 1094 toward reflector 1096, and is further reflected by reflector 1096 toward outcoupling surface 1092.

The emitted light 1098 may be reflected by the eye of the user toward reflector 1084, which further reflects the light toward the camera. Reflector 1084 may be tilted at an angle such that the reflected light reaches the camera. If multiple light sources and multiple corresponding reflective coatings are used, each reflective coating may be tilted at a different angle to reflect light from the eye of the user toward the camera. Although reflector 1096 may be in the field of view of the camera, reflector 1096 may be small enough that it will be nearly invisible to the camera. For example, reflector 1096 may only appear in a single pixel of the focal plane array of the camera. Reflector 1096 may have a maximum linear dimension of 100 µm or less.

Reflectors 1082 and 1084 may be hot mirror coatings that reflect near infrared light and transmit visible light. Further, reflectors 1082 and 1084 may be formed on a flat surface of prisms within substrate 1076. A Fresnel lens may be formed on each flat surface in order to focus the reflected light. Alternatively, reflectors 1082 and 1084 may be formed on a curved surface of prisms within substrate 1076. The curved surface may include a concave surface, a convex surface, a cylindrical surface, an aspherical surface, and/or a freeform surface.

In other embodiments, the beam diverting components may be gratings, such as surface relief gratings or volume Bragg gratings. For example, a surface relief grating may be formed at an outcoupling surface of a substrate, such as outcoupling surface 732 shown in FIG. 7. Alternatively, the gratings may be integrated within reflectors, such as reflectors 822 and/or 824 shown in FIG. 8A. In all embodiments, the beam diverting components may include any combination of reflectors, prisms, lenses, and/or gratings.

Figure 11:
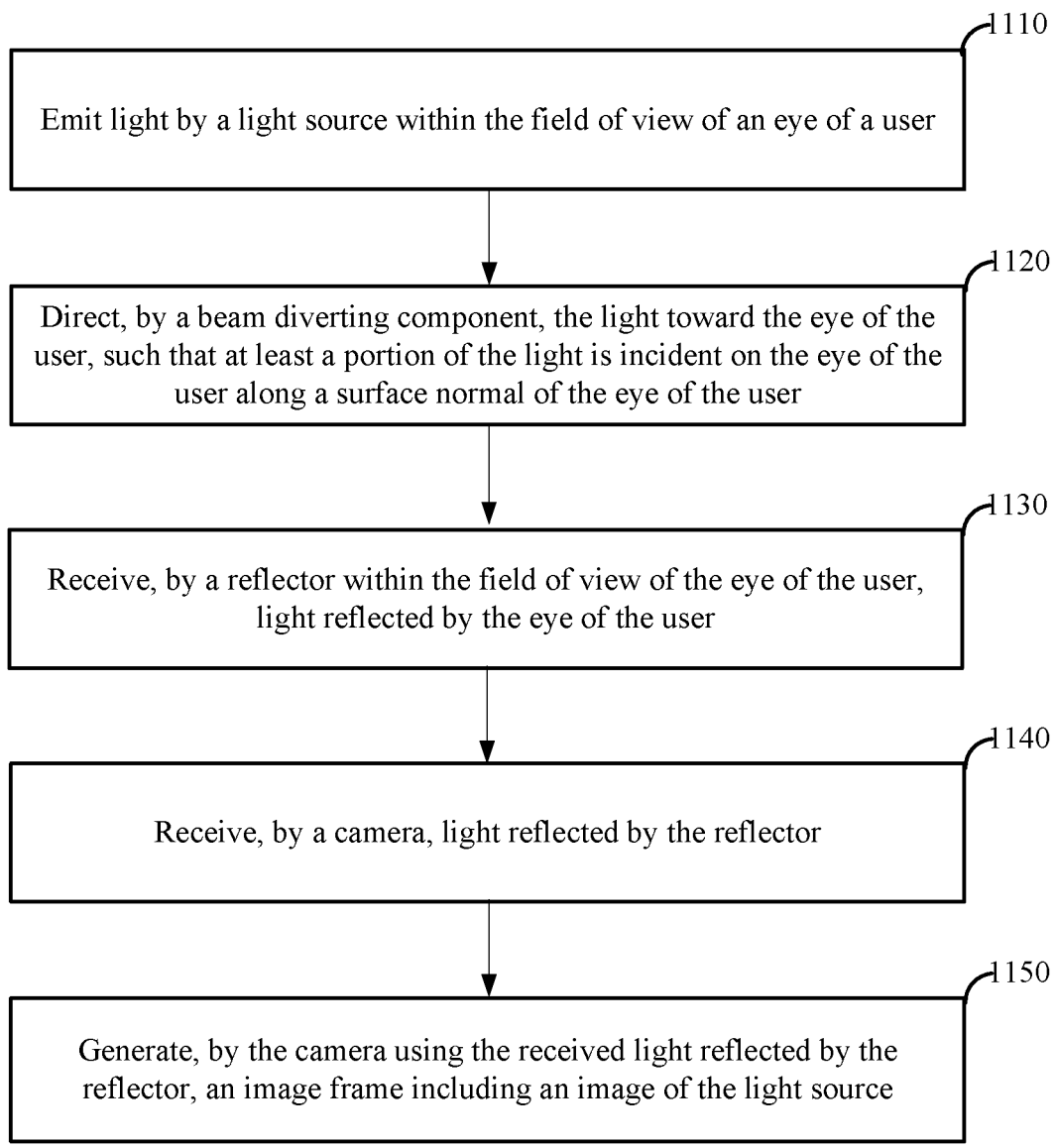
FIG. 11 is a flow chart illustrating an example method of eye illumination for eye tracking in a near-eye display, according to certain embodiments.

FIG. 11 is a flow chart 1100 illustrating an example method of eye illumination for eye tracking in a near-eye display, according to certain embodiments. The method may be performed by, for example, eye-tracking unit 130 in near-eye display 120 of FIG. 1.

At block 1110, a light source (e.g., a VCSEL or a micro-LED) of an eye-tracking unit in a near-eye display device may emit light. The light source may be within a field of view of an eye of a user. In order to prevent the user from perceiving or being affected by the presence of the light source, a maximum dimension of the light source in a plane parallel to an emission surface of the light source may be less than 200 µm. The light may be in the NIR region of the spectrum, such as between 830 nm and 860 nm, or between 930 nm and 980 nm. An angle of an emission cone of the light from the light source may be less than 30°.

At block 1120, a beam diverting component may change the direction of the light from the light source in order to direct the light from the light source toward the eye of the user. The beam diverting component may be designed such that at least a portion of the light is incident on the eye of the user at an angle with respect to a vector that is normal to a surface of the eye of the user. Other portions of the light may be incident on the eye of the user at other angles, or may not be incident on the eye of the user.

At block 1130, a reflector of the eye-tracking unit may receive light that is reflected by the eye of the user. The reflector may be within the field of view of the eye of the user. The light reflected by the eye of the user may include light specularly reflected by the cornea of the eye and light diffusively reflected or diffracted by features within the eye, such as features on the iris or pupil of the eye.

At block 1140, a camera of the eye-tracking unit may receive light that is reflected by the reflector. The light reflected by the eye of the user may include light specularly reflected by the cornea of the eye and light diffusively reflected or diffracted by features within the eye, such as features on the iris or pupil of the eye.

At block 1150, the camera may generate an image frame including an image of the light source (a "glint") reflected by the eye of the user, by detecting the light reflected from the eye of the user using an image sensor. In embodiments where multiple light sources are used, multiple glints may be captured in the captured image frame. The location(s) of the glint(s) in the captured image frame and/or other features in the captured image frame that correspond to features in different areas of the eye may then be used to determine a position of the user's eye as described above.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 12:
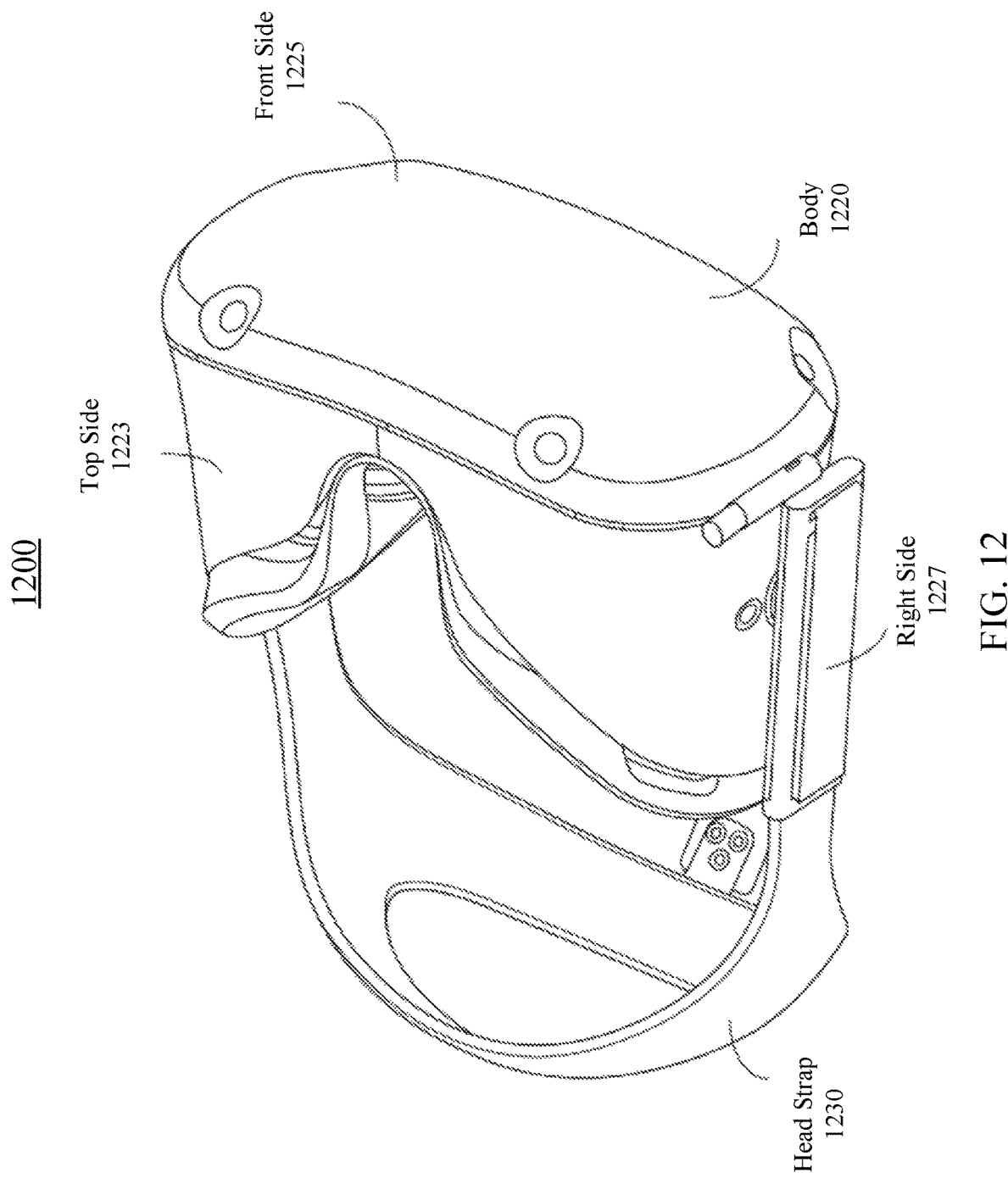
FIG. 12 is a perspective view of an example near-eye display in the form of a head-mounted display (HMD) device for implementing some of the examples disclosed herein.

FIG. 12 is a perspective view of an example near-eye display in the form of a head-mounted display (HMD) device 1200 for implementing some of the example near-eye displays (e.g., near-eye display 120) disclosed herein. HMD device 1200 may be a part of, e.g., a virtual reality (VR) system, an augmented reality (AR) system, a mixed reality (MR) system, or some combinations thereof. HMD device 1200 may include a body 1220 and a head strap 1230. FIG. 12 shows a top side 1223, a front side 1225, and a right side 1227 of body 1220 in the perspective view. Head strap 1230 may have an adjustable or extendible length. There may be a sufficient space between body 1220 and head strap 1230 of HMD device 1200 for allowing a user to mount HMD device 1200 onto the user's head. In various embodiments, HMD device 1200 may include additional, fewer, or different components. For example, in some embodiments, HMD device 1200 may include eyeglass temples and temples tips as shown in, for example, FIGS. 2-4, rather than head strap 1230.

HMD device 1200 may present to a user media including virtual and/or augmented views of a physical, real-world environment with computer-generated elements. Examples of the media presented by HMD device 1200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 12) enclosed in body 1220 of HMD device 1200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro-LED display, an active-matrix organic light emitting diode (AMOLED) display, a transparent organic light emitting diode (TOLED) display, some other display, or some combinations thereof. HMD device 1200 may include two eye box regions.

In some implementations, HMD device 1200 may include various sensors (not shown), such as depth sensors, motion sensors, position sensors, and eye tracking sensors. Some of these sensors may use a structured light pattern for sensing. In some implementations, HMD device 1200 may include an input/output interface for communicating with a console. In some implementations, HMD device 1200 may include a virtual reality engine (not shown) that can execute applications within HMD device 1200 and receive depth information, position information, acceleration information, velocity information, predicted future positions, or some combination thereof of HMD device 1200 from the various sensors. In some implementations, the information received by the virtual reality engine may be used for producing a signal (e.g., display instructions) to the one or more display assemblies. In some implementations, HMD device 1200 may include locators (not shown, such as locators 126) located in fixed positions on body 1220 relative to one another and relative to a reference point. Each of the locators may emit light that is detectable by an external imaging device.

Figure 13:
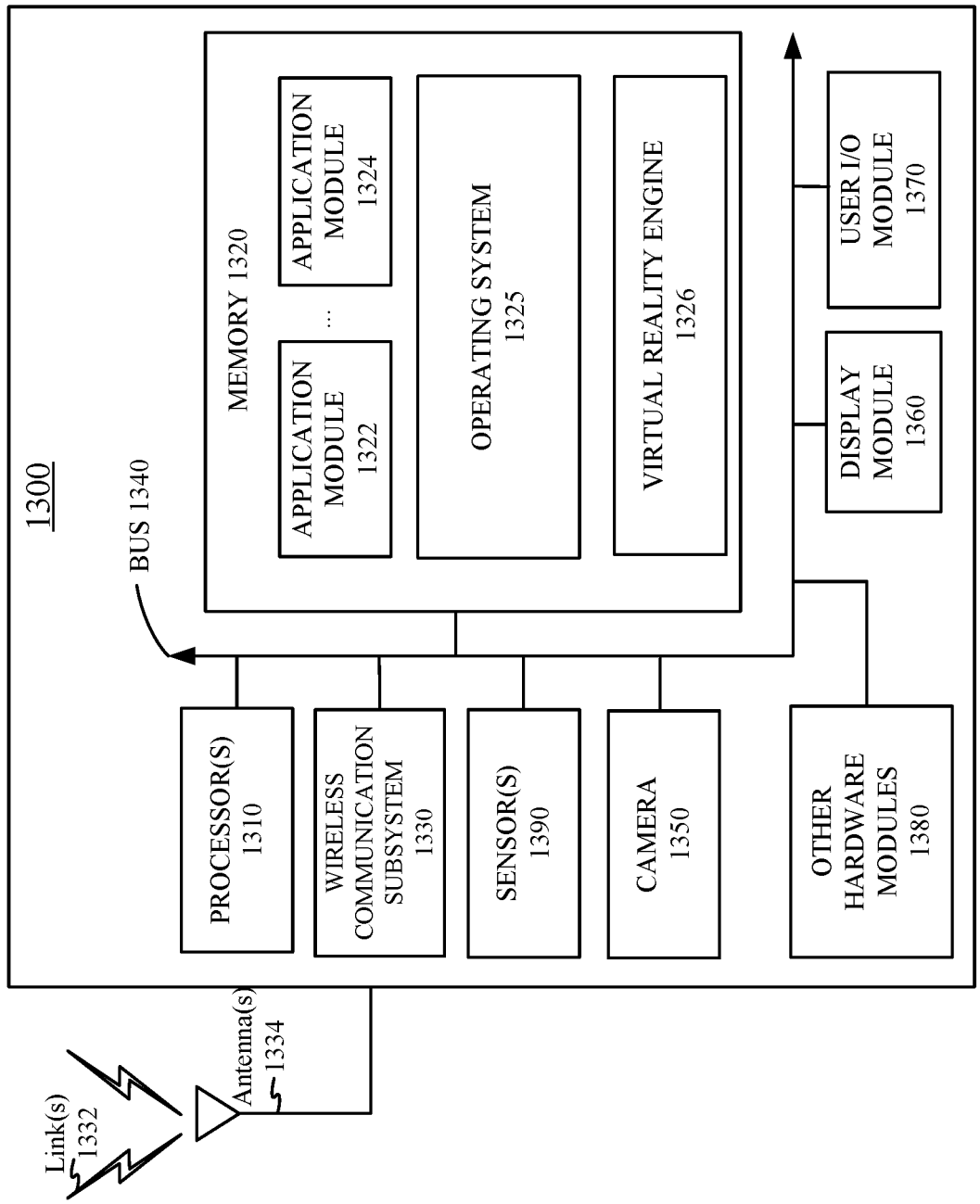
FIG. 13 is a simplified block diagram of an example electronic system of an example near-eye display for implementing some of the examples disclosed herein.

FIG. 13 is a simplified block diagram of an example electronic system 1300 of an example near-eye display (e.g., HMD device) for implementing some of the examples disclosed herein. Electronic system 1300 may be used as the electronic system of HMD device 1000 or other near-eye displays described above. In this example, electronic system 1300 may include one or more processor(s) 1310 and a memory 1320. Processor(s) 1310 may be configured to execute instructions for performing operations at a number of components, and can be, for example, a general-purpose processor or microprocessor suitable for implementation within a portable electronic device. Processor(s) 1310 may be communicatively coupled with a plurality of components within electronic system 1300. To realize this communicative coupling, processor(s) 1310 may communicate with the other illustrated components across a bus 1340. Bus 1340 may be any subsystem adapted to transfer data within electronic system 1300. Bus 1340 may include a plurality of computer buses and additional circuitry to transfer data.

Memory 1320 may be coupled to processor(s) 1310. In some embodiments, memory 1320 may offer both short-term and long-term storage and may be divided into several units. Memory 1320 may be volatile, such as static random access memory (SRAM) and/or dynamic random access memory (DRAM) and/or non-volatile, such as read-only memory (ROM), flash memory, and the like. Furthermore, memory 1320 may include removable storage devices, such as secure digital (SD) cards. Memory 1320 may provide storage of computer-readable instructions, data structures, program modules, and other data for electronic system 1300. In some embodiments, memory 1320 may be distributed into different hardware modules. A set of instructions and/or code might be stored on memory 1320. The instructions might take the form of executable code that may be executable by electronic system 1300, and/or might take the form of source and/or installable code, which, upon compilation and/or installation on electronic system 1300 (e.g., using any of a variety of generally available compilers, installation programs, compression/decompression utilities, etc.), may take the form of executable code.

In some embodiments, memory 1320 may store a plurality of application modules 1322 through 1324, which may include any number of applications. Examples of applications may include gaming applications, conferencing applications, video playback applications, or other suitable applications. The applications may include a depth sensing function or eye tracking function. Application modules 1322-1324 may include particular instructions to be executed by processor(s) 1310. In some embodiments, certain applications or parts of application modules 1322-1324 may be executable by other hardware modules 1380. In certain embodiments, memory 1320 may additionally include secure memory, which may include additional security controls to prevent copying or other unauthorized access to secure information.

In some embodiments, memory 1320 may include an operating system 1325 loaded therein. Operating system 1325 may be operable to initiate the execution of the instructions provided by application modules 1322-1324 and/or manage other hardware modules 1380 as well as interfaces with a wireless communication subsystem 1330 which may include one or more wireless transceivers. Operating system 1325 may be adapted to perform other operations across the components of electronic system 1300 including threading, resource management, data storage control and other similar functionality.

Wireless communication subsystem 1330 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1300 may include one or more antennas 1334 for wireless communication as part of wireless communication subsystem 1330 or as a separate component coupled to any portion of the system. Depending on desired functionality, wireless communication subsystem 1330 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1330 may permit data to be exchanged with a network, other computer systems, and/or any other devices described herein. Wireless communication subsystem 1330 may include a means for transmitting or receiving data, such as identifiers of HMD devices, position data, a geographic map, a heat map, photos, or videos, using antenna(s) 1334 and wireless link(s) 1332. Wireless communication subsystem 1330, processor(s) 1310, and memory 1320 may together comprise at least a part of one or more of a means for performing some functions disclosed herein.

Embodiments of electronic system 1300 may also include one or more sensors 1390. Sensor(s) 1390 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1390 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1300 may include a display module 1360. Display module 1360 may be a near-eye display, and may graphically present information, such as images, videos, and various instructions, from electronic system 1300 to a user. Such information may be derived from one or more application modules 1322-1324, virtual reality engine 1326, one or more other hardware modules 1380, a combination thereof, or any other suitable means for resolving graphical content for the user (e.g., by operating system 1325). Display module 1360 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 1300 may include a user input/output module 1370. User input/output module 1370 may allow a user to send action requests to electronic system 1300. An action request may be a request to perform a particular action. For example, an action request may be to start or end an application or to perform a particular action within the application. User input/output module 1370 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1300. In some embodiments, user input/output module 1370 may provide haptic feedback to the user in accordance with instructions received from electronic system 1300. For example, the haptic feedback may be provided when an action request is received or has been performed.

Electronic system 1300 may include a camera 1350 that may be used to take photos or videos of a user, for example, for tracking the user's eye position. Camera 1350 may also be used to take photos or videos of the environment, for example, for VR, AR, or MR applications. Camera 1350 may include, for example, a complementary metal-oxide-semiconductor (CMOS) image sensor with a few millions or tens of millions of pixels. In some implementations, camera 1350 may include two or more cameras that may be used to capture 3-D images.

In some embodiments, electronic system 1300 may include a plurality of other hardware modules 1380. Each of other hardware modules 1380 may be a physical module within electronic system 1300. While each of other hardware modules 1380 may be permanently configured as a structure, some of other hardware modules 1380 may be temporarily configured to perform specific functions or temporarily activated. Examples of other hardware modules 1380 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1380 may be implemented in software.

In some embodiments, memory 1320 of electronic system 1300 may also store a virtual reality engine 1326. Virtual reality engine 1326 may execute applications within electronic system 1300 and receive position information, acceleration information, velocity information, predicted future positions, or some combination thereof of the HMD device from the various sensors. In some embodiments, the information received by virtual reality engine 1326 may be used for producing a signal (e.g., display instructions) to display module 1360. For example, if the received information indicates that the user has looked to the left, virtual reality engine 1326 may generate content for the HMD device that mirrors the user's movement in a virtual environment. Additionally, virtual reality engine 1326 may perform an action within an application in response to an action request received from user input/output module 1370 and provide feedback to the user. The provided feedback may be visual, audible, or haptic feedback. In some implementations, processor(s) 1310 may include one or more GPUs that may execute virtual reality engine 1326.

In various implementations, the above-described hardware and modules may be implemented on a single device or on multiple devices that can communicate with one another using wired or wireless connections. For example, in some implementations, some components or modules, such as GPUs, virtual reality engine 1326, and applications (e.g., tracking application), may be implemented on a console separate from the head-mounted display device. In some implementations, one console may be connected to or support more than one HMD.

In alternative configurations, different and/or additional components may be included in electronic system 1300. Similarly, functionality of one or more of the components can be distributed among the components in a manner different from the manner described above. For example, in some embodiments, electronic system 1300 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An illuminator for eye tracking comprising:
   a light source configured to be positioned within a field of view of an eye of a user;
   a substrate comprising a first surface on which the light source is mounted and a second surface through which light is outcoupled toward the eye of the user;
   a beam diverting component configured to direct light from the light source toward the eye of the user;
   a first reflector configured to shadow the light source from a field of view of a camera; and
   a second reflector configured to receive light from the light source that is reflected by the eye of the user, and to direct the light toward the camera such that the light is received by the camera,
   wherein the first reflector and the second reflector are arranged within the substrate between the first surface and the second surface.

2. The illuminator of claim 1, wherein the first reflector is a first coating on a first prism, and the second reflector is a second coating on a second prism.

3. The illuminator of claim 2, wherein a first portion of the second prism that is shadowed by the first reflector is uncoated, and a second portion of the second prism that is unshadowed by the first reflector is coated by the first coating.

4. The illuminator of claim 1, wherein the light source is configured to emit light that propagates between the first reflector and the second reflector.

5. The illuminator of claim 1, wherein the beam diverting component is formed on the second surface of the substrate, is indented toward the first surface of the substrate, and has a shape of a prism, a cone, a diffraction grating, or a lens.

6. The illuminator of claim 1, wherein the beam diverting component is formed on the second surface of the substrate, protrudes away from the first surface of the substrate, and has a shape of a prism or a cone.

7. The illuminator of claim 1, wherein:
   the beam diverting component comprises a third reflector and a fourth reflector, each of which is arranged within the substrate between the first surface and the second surface,
   the third reflector is configured to reflect light from the light source to the fourth reflector, and
   the fourth reflector is configured to reflect the light toward the second surface of the substrate.

8. The illuminator of claim 1, wherein the beam diverting component is a surface relief grating that is formed at the second surface of the substrate or a volume Bragg grating.

9. The illuminator of claim 1, wherein each of the first reflector and the second reflector is configured to reflect infrared light and to transmit visible light.

10. A system for eye tracking comprising:
a light source configured to be positioned within a field of view of an eye of a user;
a substrate comprising a first surface on which the light source is mounted and a second surface through which light is outcoupled toward the eye of the user;
a beam diverting component configured to direct light from the light source toward the eye of the user,
a camera configured to capture an image of the light source reflected by the eye of the user;
a first reflector configured to shadow the light source from a field of view of the camera; and
a second reflector configured to receive light from the light source that is reflected by the eye of the user, and to direct the light toward the camera such that the light is received by the camera,
wherein the first reflector and the second reflector are arranged within the substrate between the first surface and the second surface.

11. The system of claim 10, wherein the first reflector is a first coating on a first prism, and the second reflector is a second coating on a second prism.

12. The system of claim 11, wherein a first portion of the second prism that is shadowed by the first reflector is uncoated, and a second portion of the second prism that is unshadowed by the first reflector is coated by the first coating.

13. The system of claim 10, wherein the light source is configured to emit light that propagates between the first reflector and the second reflector.

14. The system of claim 10, wherein the beam diverting component is formed on the second surface of the substrate, is indented toward the first surface of the substrate, and has a shape of a prism, a cone, a diffraction grating, or a lens.

15. The system of claim 10, wherein the beam diverting component is formed on the second surface of the substrate, protrudes away from the first surface of the substrate, and has a shape of a prism or a cone.

16. The system of claim 10, wherein:
the beam diverting component comprises a third reflector and a fourth reflector, each of which is arranged within the substrate between the first surface and the second surface,
the third reflector is configured to reflect light from the light source to the fourth reflector, and
the fourth reflector is configured to reflect the light toward the second surface of the substrate.

17. The system of claim 10, wherein the beam diverting component is a surface relief grating that is formed at the second surface of the substrate or a volume Bragg grating.

18. The system of claim 10, wherein each of the first reflector and the second reflector is configured to reflect infrared light and to transmit visible light.

* * * * *